United States Patent
Plude et al.

(10) Patent No.: US 10,661,889 B2
(45) Date of Patent: May 26, 2020

(54) HYDRAULIC SYSTEMS FOR SHRINKING LANDING GEAR

(71) Applicant: The Boeing Company, Chicago, IL (US)

(72) Inventors: Leo W. Plude, Woodinville, WA (US); Malcolm S. Bryant, Maple Valley, WA (US); Gary M. Lindahl, Newcastle, WA (US); Edward J. Nowakowski, St. Peters, MO (US)

(73) Assignee: The Boeing Company, Chicago, IL (US)

( * ) Notice: Subject to any disclaimer, the term of this patent is extended or adjusted under 35 U.S.C. 154(b) by 293 days.

(21) Appl. No.: 15/866,135

(22) Filed: Jan. 9, 2018

(65) Prior Publication Data

US 2019/0211848 A1    Jul. 11, 2019

(51) Int. Cl.
| | |
|---|---|
| *B64C 25/22* | (2006.01) |
| *F15B 11/072* | (2006.01) |
| *F15B 11/00* | (2006.01) |
| *B64C 25/60* | (2006.01) |
| *B64C 25/34* | (2006.01) |
| *B64C 25/12* | (2006.01) |

(52) U.S. Cl.
CPC .............. *B64C 25/22* (2013.01); *B64C 25/60* (2013.01); *F15B 11/003* (2013.01); *F15B 11/072* (2013.01); *B64C 25/34* (2013.01); *B64C 2025/125* (2013.01); *F15B 2211/30505* (2013.01)

(58) Field of Classification Search
CPC ......... B64C 25/22; B64C 25/60; B64C 25/62; B64C 25/10; B64C 25/34; B64C 2025/008; F16F 9/063; F15B 11/072; F15B 11/003; F15B 2211/30505
USPC ..................................................... 244/122 R
See application file for complete search history.

(56) References Cited

U.S. PATENT DOCUMENTS

| | | | |
|---|---|---|---|
| 5,908,174 A * | 6/1999 | Churchill ............... | B64C 25/18 244/102 SS |
| 8,070,095 B2 | 12/2011 | Luce et al. | |
| 8,556,209 B2 | 10/2013 | Luce | |
| 8,573,606 B1 * | 11/2013 | Kim ...................... | B60G 13/08 267/64.17 |

(Continued)

*Primary Examiner* — Richard R. Green
*Assistant Examiner* — Arfan Y Sinaki
(74) *Attorney, Agent, or Firm* — Hanley, Flight & Zimmerman, LLC

(57) ABSTRACT

Hydraulic systems for shrinking landing gear shrink are described. An example apparatus includes a landing gear strut, a transfer cylinder, aircraft hydraulics, a pressure vessel, and a pressure-operated check valve. The landing gear strut has an outer cylinder and an inner cylinder movable relative to the outer cylinder between a first position and a second position. The landing gear strut has a first length when the inner cylinder is in the first position and a second length less than the first length when the inner cylinder is in the second position. The transfer cylinder exchanges hydraulic fluid with the landing gear strut. The aircraft hydraulics exchange hydraulic fluid with the transfer cylinder. The pressure vessel exchanges gas with the landing gear strut. The pressure-operated check valve controls an exchange of gas between the pressure vessel and the landing gear strut based on hydraulic fluid received from the aircraft hydraulics.

21 Claims, 7 Drawing Sheets

(56) References Cited

U.S. PATENT DOCUMENTS

| | | |
|---|---|---|
| 8,695,764 B2 | 4/2014 | Luce |
| 8,727,273 B2 | 5/2014 | Luce |
| 9,321,525 B2 | 4/2016 | Luce |
| 9,481,453 B2 | 11/2016 | Luce |
| 2008/0111022 A1* | 5/2008 | Lahargou ................ B64C 25/60 244/100 R |
| 2010/0219290 A1* | 9/2010 | Luce ....................... B64C 25/14 244/102 SL |
| 2016/0101877 A1* | 4/2016 | Shepherd ............. G01F 23/296 29/402.18 |

* cited by examiner

HYDRAULIC SYSTEMS FOR SHRINKING LANDING GEAR

FIELD OF THE DISCLOSURE

This disclosure relates generally to landing gear for aircraft and, more particularly, to hydraulic systems for shrinking landing gear.

BACKGROUND

Aircraft (e.g., commercial aircraft) commonly include landing gear (e.g., left main landing gear, right main landing gear, etc.) that may be hydraulically actuated to move between a deployed position and a retracted position. For example, the landing gear of an aircraft may by hydraulically actuated to move from the deployed position to the retracted position subsequent to and/or in connection with a takeoff procedure of the aircraft, and from the retracted position back to the deployed position prior to and/or in connection with a landing procedure of the aircraft. Hydraulic actuation of the landing gear typically occurs in response to a manual actuation (e.g., via a pilot of the aircraft) of a landing gear lever located in a cockpit of the aircraft.

Some known aircraft implement landing gear that must be shrunk (e.g., reduced in length) prior to being moved from the deployed position to the retracted position. For example, the length of the landing gear may need to be reduced (e.g., shrunk) such that the landing gear is able to fit within the spatial confines of a well of the aircraft that stows the landing gear in the retracted position. In such known aircraft, the shrinking of the landing gear commonly occurs in parallel with actuating the landing gear from the deployed position to the retracted position, and/or is dependent upon the kinematic motion associated with actuating the landing gear from the deployed position to the retracted position.

SUMMARY

Hydraulic systems for shrinking landing gear are disclosed. In some examples, an apparatus is disclosed. In some disclosed examples, the apparatus comprises a landing gear strut, a transfer cylinder, aircraft hydraulics, a pressure vessel, and a pressure-operated check valve. In some disclosed examples, the landing gear strut has an outer cylinder and an inner cylinder. In some disclosed examples, the inner cylinder is movable relative to the outer cylinder between a first position and a second position. In some disclosed examples, the landing gear strut has a first length when the inner cylinder is in the first position and a second length less than the first length when the inner cylinder is in the second position. In some disclosed examples, the transfer cylinder is to exchange hydraulic fluid with the landing gear strut. In some disclosed examples, the aircraft hydraulics are to exchange hydraulic fluid with the transfer cylinder. In some disclosed examples, the pressure vessel is to exchange gas with the landing gear strut. In some disclosed examples, the pressure-operated check valve is operatively coupled to the aircraft hydraulics, the pressure vessel, and the landing gear strut. In some disclosed examples, the pressure-operated check valve is to control an exchange of gas between the pressure vessel and the landing gear strut based on hydraulic fluid received at the pressure-operated check valve from the aircraft hydraulics.

In some examples, an apparatus is disclosed. In some disclosed examples, the apparatus comprises a landing gear strut, aircraft hydraulics, a pressure vessel, and a pressure-operated check valve. In some disclosed examples, the landing gear strut has an outer cylinder and an inner cylinder. In some disclosed examples, the inner cylinder is movable relative to the outer cylinder between a first position and a second position. In some disclosed examples, the landing gear strut has a first length when the inner cylinder is in the first position and a second length less than the first length when the inner cylinder is in the second position. In some disclosed examples, the aircraft hydraulics are to exchange hydraulic fluid with the landing gear strut. In some disclosed examples, the pressure vessel is to exchange gas with the landing gear strut. In some disclosed examples, the pressure-operated check valve is operatively coupled to the aircraft hydraulics, the pressure vessel, and the landing gear strut. In some disclosed examples, the pressure-operated check valve is to control an exchange of gas between the pressure vessel and the landing gear strut based on hydraulic fluid received at the pressure-operated check valve from the aircraft hydraulics.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

Example hydraulic shrink systems disclosed herein provide for shrinking and/or unshrinking of an aircraft landing gear strut independently from the kinematic motion associated with actuating the landing gear strut between a deployed position and a retracted position. Shrinking and/or unshrinking the landing gear strut independently from the kinematic motion of the landing gear strut advantageously allows for the shrinking and/or unshrinking processes of the landing gear strut to be performed independently relative to (e.g., in series, as opposed to in parallel with) the retraction and/or deployment process associated with the landing gear strut.

In some examples, the hydraulic shrink systems disclosed herein incorporate and/or implement a transfer cylinder to shrink and/or unshrink a landing gear strut independently from the kinematic motion of the landing gear strut. In other examples, the hydraulic shrink systems disclosed herein incorporate and/or implement a travel-limited piston to shrink and/or unshrink a landing gear strut independently from the kinematic motion of the landing gear strut. Example hydraulic shrink systems disclosed herein also include a gas volume that approximately doubles during the process of shrinking the landing gear strut. The doubling of the gas volume during the shrinking of the landing gear strut advantageously reduces the compressive force and/or actuation pressure required to complete the shrinking process.

Figure 1:
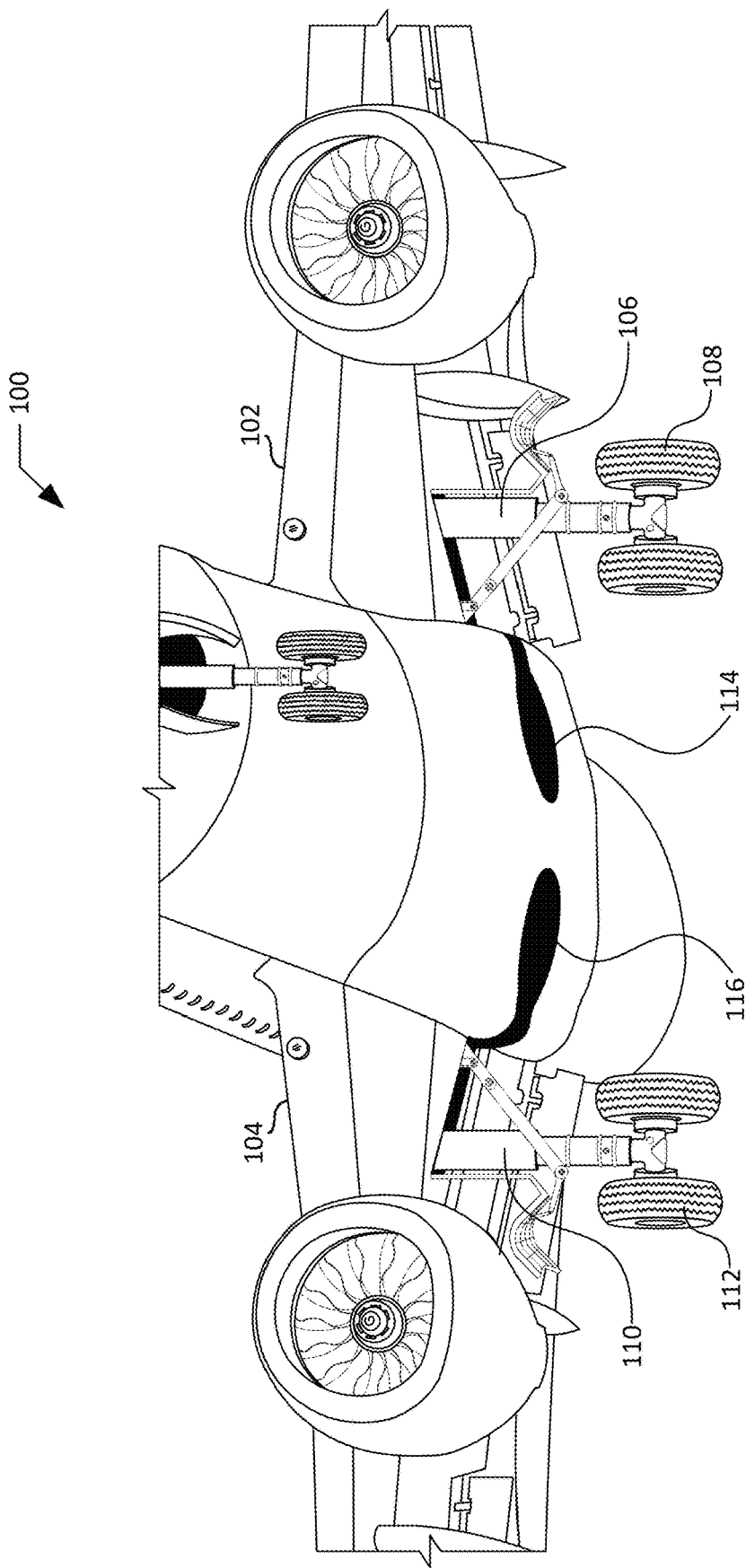
FIG. 1 illustrates an example aircraft in which example hydraulic shrink systems may be implemented in accordance with the teachings of this disclosure.

FIG. 1 illustrates an example aircraft 100 in which example hydraulic shrink systems may be implemented in accordance with the teachings of this disclosure. The aircraft 100 includes an example left wing 102 and an example right wing 104. The aircraft 100 also includes an example left main landing gear (LMLG) 106 coupled to the left wing 102 and having a first example set of wheels 108, and an example right main landing gear (RMLG) 110 coupled to the right wing 104 and having a second example set of wheels 112.

In the illustrated example of FIG. 1, the LMLG 106 and the RMLG 110 are in a deployed (e.g., downlocked) position. The LMLG 106 is movable from the deployed position shown in FIG. 1 to a retracted position in which the LMLG 106 and/or the first set of wheels 108 is/are positioned in a first example well 114 of the aircraft 100 of FIG. 1. The RMLG 110 is also movable from the deployed position shown in FIG. 1 to a retracted position in which the RMLG 110 and/or the second set of wheels 112 is/are positioned in a second example well 116 of the aircraft 100 of FIG. 1. Downlock members (e.g., downlock struts, rods, shafts, and/or links) that are respectively coupled to corresponding ones of the LMLG 106 and the RMLG 110 of FIG. 1 may be positioned and/or engaged to secure and/or lock the LMLG 106 and the RMLG 110 in the deployed position, and may be repositioned and/or disengaged to enable the LMLG 106 and the RMLG 110 to be moved from the deployed position to the retracted position. Movement of the LMLG 106 and the RMLG 110 between the deployed and retracted positions occurs via a landing gear hydraulic actuation system located within the aircraft 100 of FIG. 1. The landing gear hydraulic actuation system is operatively coupled to a controller located within the aircraft 100 of FIG. 1. The controller manages and/or controls the operation of the landing gear hydraulic actuation system.

In some examples, a landing gear lever located within the aircraft 100 of FIG. 1 (e.g., in a cockpit of the aircraft 100) is operatively coupled to the controller. Movement of the landing gear lever (e.g., via a pilot) between a down position and an up position generates corresponding positional inputs to be received by the controller to facilitate movement of the LMLG 106 and the RMLG 110 between the deployed and retracted positions described above. The landing gear lever may be moved from the down position to the up position subsequent to and/or in connection with a takeoff procedure of the aircraft 100 of FIG. 1. The landing gear lever may be moved from the up position to the down position prior to and/or in connection with a landing procedure of the aircraft 100 of FIG. 1. In some examples, operation of the hydraulic shrink systems disclosed herein may be based in part on the position of the landing gear lever.

In other examples (e.g., in examples where the aircraft 100 of FIG. 1 is an unmanned and/or autonomous aircraft), a landing gear position manager (e.g., a programmable processor) located within the aircraft 100 of FIG. 1 is operatively coupled to the controller. The landing gear position manager may be remotely programmed, commanded, set, and/or controlled to obtain, take on, and/or achieve a first state corresponding to a down position or a second state corresponding to an up position to generate corresponding positional inputs to be received by the controller to facilitate movement of the LMLG 106 and the RMLG 110 between the deployed and retracted positions described above. The landing gear position manager may be remotely programmed, commanded, and/or set to the first state corresponding to the up position subsequent to and/or in connection with a takeoff procedure of the aircraft 100 of FIG. 1. The landing gear position manager may be remotely programmed, commanded, and/or set to the second state corresponding to the down position prior to and/or in connection with a landing procedure of the aircraft 100 of FIG. 1. In some examples, operation of the hydraulic shrink systems disclosed herein may be based in part on the state and/or the corresponding position of the landing gear position manager.

Respective ones of the LMLG 106 and the RMLG 110 have a first length (e.g., an unshrunk length) when positioned in the deployed (e.g., downlocked) position shown in FIG. 1. For example, the first length of the LMLG 106 may be measured from the underside of the left wing 102 of the aircraft 100 to the bottom of the first set of wheels 108 when the LMLG 106 is positioned in the deployed position shown in FIG. 1, and the first length of the RMLG 110 may be measured from the underside of the right wing 104 of the aircraft 100 to the bottom of the second set of wheels 112 when the RMLG 110 is positioned in the deployed position shown in FIG. 1. In some disclosed examples, the first length (e.g., the unshrunk length) of the LMLG 106 and/or the RMLG 110 may exceed spatial limitations defined by the shape and/or volume of corresponding ones of the first well 114 and/or the second well 116 of the aircraft 100 of FIG. 1. In such examples, it becomes necessary to shrink (e.g., to reduce the length of) the LMLG 106 and/or the RMLG 110 from the first length to a second length (e.g., a shrunk length) that is less than the first length, and which enables the LMLG 106 and/or the RMLG 110 to fit within the spatial limitations defined by the shape and/or volume of the corresponding ones of the first well 114 and/or the second well 116 of the aircraft 100 of FIG. 1.

Shrinking and/or unshrinking of the LMLG 106 and/or the RMLG 110 of FIG. 1 may occur via the example hydraulic shrink systems disclosed herein. The LMLG 106 and/or the RMLG 110 of FIG. 1 may be shrunk (e.g. reduced in length) from the first length to the second length prior to and/or in connection with moving the LMLG 106 and/or the RMLG 110 from the deployed position to the retracted position, and may be unshrunk (e.g., increased in length) from the second length to the first length subsequent to and/or in connection with moving the LMLG 106 and/or the RMLG 110 from the retracted position to the deployed position. In some examples, the difference between the first length (e.g., the unshrunk length) and the second length (e.g., the shrunk length) of respective ones of the LMLG 106 and the RMLG 110 of FIG. 1 may be approximately nine inches. In other examples, the difference between the first length and the second length may be greater than or less than nine inches (e.g., six inches, twelve inches, etc.).

Figure 2:
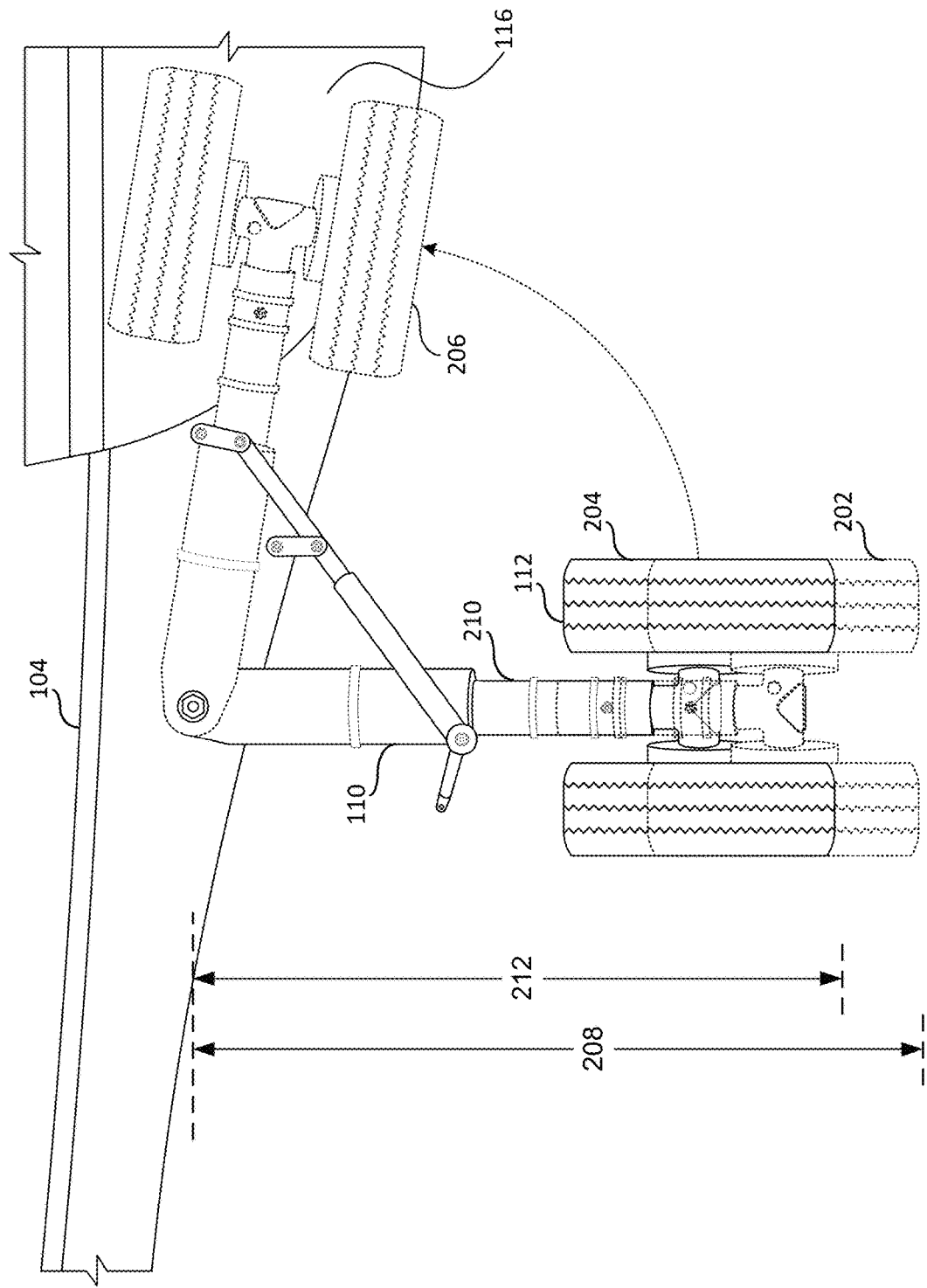
FIG. 2 illustrates the example RMLG of FIG. 1 in an example unshrunk deployed position, in an example shrunk deployed position, and in an example shrunk retracted position.

FIG. 2 illustrates the example RMLG 110 of FIG. 1 in an example unshrunk deployed position 202, in an example shrunk deployed position 204, and in an example shrunk retracted position 206. The RMLG 110 of FIGS. 1 and 2 may be positioned in the unshrunk deployed position 202 of FIG. 2 (shown in phantom) when the second set of wheels 112 of the RMLG 110 of FIGS. 1 and 2 is not in contact with a ground surface (e.g., when the aircraft 100 of FIG. 1 is airborne). The RMLG 110 of FIGS. 1 and 2 has an example first length 208 measured from the underside of the right wing 104 of FIGS. 1 and 2 to the bottom of the second set of wheels 112 of FIGS. 1 and 2 when the RMLG 110 is in the unshrunk deployed position 202 shown in FIG. 2. The first length 208 of FIG. 2 may be associated with an example landing gear oleo strut 210 of the RMLG 110 of FIGS. 1 and 2 being uncompressed and/or extended in response to the weight of the aircraft 100 being removed from the RMLG 110 subsequent to and/or in connection with takeoff of the aircraft 100. The first length 208 of FIG. 2 may also be associated with the landing gear oleo strut 210 of the RMLG 110 of FIGS. 1 and 2 being unshrunk (e.g., from the shrunk deployed position 204 of FIG. 2) via the example hydraulic shrink systems disclosed herein.

The RMLG 110 of FIGS. 1 and 2 may be positioned in the shrunk deployed position 204 of FIG. 2 when the second set of wheels 112 of the RMLG 110 of FIGS. 1 and 2 are not in contact with a ground surface (e.g., when the aircraft 100 of FIG. 1 is airborne) and when the landing gear oleo strut 210 of the RMLG 110 has been shrunk. The RMLG 110 of FIGS. 1 and 2 has an example second length 212 measured from the underside of the right wing 104 of FIGS. 1 and 2 to the bottom of the second set of wheels 112 of FIGS. 1 and 2 when the RMLG 110 is in the shrunk deployed position 204 shown in FIG. 2. The second length 212 of FIG. 2 is less than the first length 208 of FIG. 2. In some examples, the second length 212 of FIG. 2 may be approximately nine inches less than the first length 208 of FIG. 2. In other examples, the difference between the first length 208 and the second length 212 of FIG. 2 may be greater than or less than nine inches (e.g., six inches, twelve inches, etc.). The second length 212 of FIG. 2 may be associated with the landing gear oleo strut 210 of the RMLG 110 of FIGS. 1 and 2 being shrunk via the example hydraulic shrink systems disclosed herein.

The RMLG 110 of FIGS. 1 and 2 may be positioned in the shrunk retracted position 206 of FIG. 2 (shown in phantom) subsequent to the landing gear oleo strut 210 of the RMLG 110 of FIGS. 1 and 2 being shrunk. The RMLG 110 of FIGS. 1 and 2 maintains the second length 212 of FIG. 2 described above when the RMLG 110 is in the shrunk retracted position 206 shown in FIG. 2, such that the RMLG 110 fits within the spatial limitations defined by the shape and/or volume of the second well 116 of FIGS. 1 and 2.

Example hydraulic shrink systems disclosed herein provide for shrinking and/or unshrinking of a landing gear strut of the LMLG 106 and/or the RMLG 110 of the aircraft 100 of FIG. 1 independently from the kinematic motion associated with actuating the LMLG 106 and/or the RMLG 110 between the deployed position and the retracted position. In some examples, the hydraulic shrink systems disclosed herein (e.g., as shown and described in connection with FIGS. 3-5) incorporate and/or implement a transfer cylinder to shrink and/or unshrink a landing gear strut independently from the kinematic motion of the landing gear strut. In other examples, the hydraulic shrink systems disclosed herein (e.g., as shown and described in connection with FIGS. 6 and 7) incorporate and/or implement a travel-limited piston to shrink and/or unshrink a landing gear strut independently from the kinematic motion of the landing gear strut.

Figure 3:
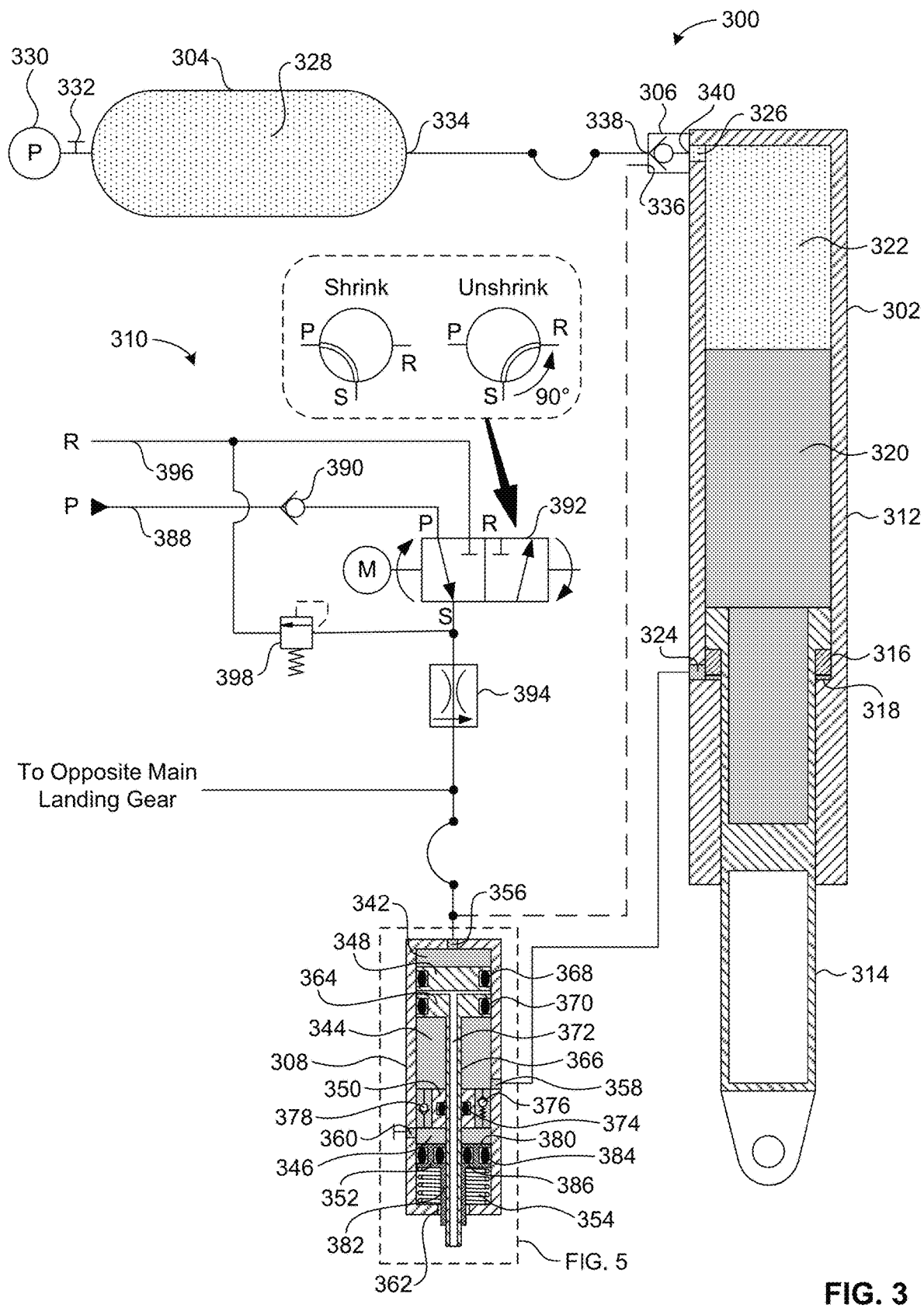
FIG. 3 is a schematic of a first example hydraulic shrink system constructed in accordance with the teachings of this disclosure.
Figure 4:
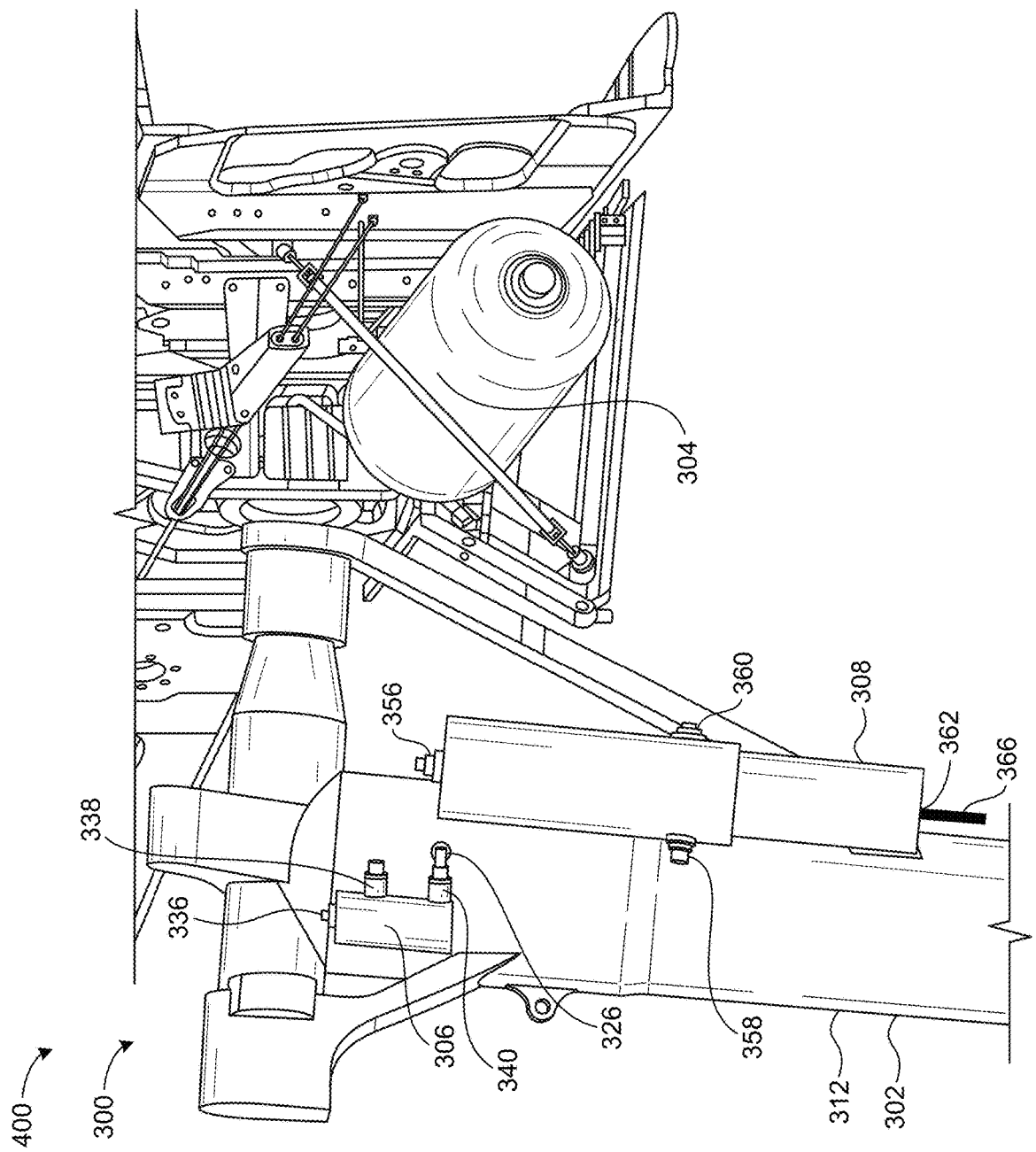
FIG. 4 illustrates an example implementation of the first example hydraulic shrink system of FIG. 3.

FIG. 3 is a schematic of a first example hydraulic shrink system 300 constructed in accordance with the teachings of this disclosure. FIG. 4 illustrates an example implementation 400 of the first example hydraulic shrink system 300 of FIG. 3. In the illustrated example of FIGS. 3 and 4, the hydraulic shrink system 300 includes an example landing gear strut 302, an example pressure vessel 304, an example pressure-operated check valve 306, an example transfer cylinder 308, and example aircraft hydraulics 310. The landing gear strut 302 is operatively coupled to the pressure-operated check valve 306 and the transfer cylinder 308. The pressure vessel 304 is operatively coupled to the pressure-operated check valve 306. The pressure-operated check valve 306 is operatively coupled to the landing gear strut 302, the pressure vessel 304, and the aircraft hydraulics 310. The transfer cylinder 308 is operatively coupled to the landing gear strut 302 and the aircraft hydraulics 310. The aircraft hydraulics 310 are operatively coupled to the pressure-operated check valve 306 and the transfer cylinder 308.

In some examples, one or more of the operative coupling(s) described above may be facilitated and/or implemented via one or more rigid and/or flexible conduit(s) and/or pressure line(s) extending between various ones of the identified structures. For example, the transfer cylinder 308 of FIGS. 3 and 4 may be operatively coupled to the landing gear strut 302 of FIGS. 3 and 4 via one or more rigid and/or flexible conduit(s) structured to carry and/or convey hydraulic fluid between the transfer cylinder 308 and the landing gear strut 302. In other examples, one or more of the operative coupling(s) described above may be facilitated and/or implemented via one or more direct connection(s) between various ones of the identified structures, where the direct connection(s) do/does not include a separate conduit and/or pressure line extending between the structures.

The landing gear strut 302 of FIGS. 3 and 4 includes an example outer cylinder 312, an example inner cylinder 314, an example strut shrink piston 316, an example strut shrink volume 318, an example strut liquid volume 320, an example strut gas volume 322, an example first port 324, and an example second port 326. The outer cylinder 312 and the inner cylinder 314 have respective fixed lengths. The inner cylinder 314 is positioned, disposed, and/or received within the outer cylinder 312 and is movable and/or slidable relative to the outer cylinder 312 between an unshrunk position and a shrunk position. In some examples, the landing gear strut 302 of FIGS. 3 and 4 has a first length when the inner cylinder 314 is in the unshrunk position relative to the outer cylinder 312, and a second length less than the first length when the inner cylinder 314 is in the shrunk position relative to the outer cylinder 312.

The strut shrink piston 316 of FIGS. 3 and 4 is located and/or positioned between the outer cylinder 312 and the inner cylinder 314 within the strut shrink volume 318 of FIGS. 3 and 4. In the illustrated example of FIGS. 3 and 4, the strut shrink piston 316 has an annular shape such that the strut shrink piston 316 surrounds and/or circumscribes an outer wall of the inner cylinder 314 while also being positioned within an inner wall of the outer cylinder 312. In some examples, one or more seal(s) may be coupled to and/or disposed on the strut shrink piston 316. In such examples, the seal(s) of the strut shrink piston 316 may provide one or more interface(s) and/or seal(s) between the outer cylinder 312 and the inner cylinder 314 to isolate the strut shrink volume 318 of FIGS. 3 and 4 from the strut liquid volume 320 of FIGS. 3 and 4.

The strut shrink volume 318 of FIGS. 3 and 4 includes and/or is a volume of pressurized hydraulic fluid (e.g., BMS 3-11 hydraulic fluid) in liquid form. In the illustrated example of FIGS. 3 and 4, the strut shrink volume 318 is in fluid communication with the first port 324 of the landing gear strut 302. In some examples, the strut shrink volume 318 includes a volume of pressurized hydraulic fluid received from and/or to be exchanged with the transfer cylinder 308 of FIGS. 3 and 4 via the first port 324 of the landing gear strut 302.

Increasing the strut shrink volume 318 of FIGS. 3 and 4 (e.g., increasing the volume of the pressurized hydraulic fluid of the strut shrink volume 318) causes the strut shrink piston 316 of FIGS. 3 and 4 to move, slide, and/or lift the inner cylinder 314 of FIGS. 3 and 4 relative to the outer cylinder 312 of FIGS. 3 and 4 away from an unshrunk position and toward a shrunk position. Decreasing the strut shrink volume 318 of FIGS. 3 and 4 (e.g., decreasing the volume of the pressurized hydraulic fluid of the strut shrink volume 318) causes the strut shrink piston 316 of FIGS. 3 and 4 to move, slide, and/or lower the inner cylinder 314 of FIGS. 3 and 4 relative to the outer cylinder 312 of FIGS. 3 and 4 away from a shrunk position and toward an unshrunk position. In the illustrated example of FIGS. 3 and 4, the strut shrink volume 318 has a minimum volume (e.g., a volume of zero) when the inner cylinder 314 and/or, more generally, the landing gear strut 302 of FIGS. 3 and 4 is in the unshrunk position (e.g., as is generally shown in FIG. 3), and has a maximum volume when the inner cylinder 314 and/or, more generally, the landing gear strut 302 of FIGS. 3 and 4 is in the shrunk position.

The strut liquid volume 320 of FIGS. 3 and 4 includes and/or is a volume of pressurized hydraulic fluid (e.g., BMS 3-11 hydraulic fluid) in liquid form. In the illustrated example of FIGS. 3 and 4, the strut liquid volume 320 includes and/or is approximately eight hundred eighty cubic inches (880 in$^3$) of BMS 3-11 hydraulic fluid in liquid form. The strut liquid volume 320 of FIGS. 3 and 4 is isolated from the strut shrink volume 318 of FIGS. 3 and 4. Unlike the strut shrink volume 318 of FIGS. 3 and 4 described above, the strut liquid volume 320 of FIGS. 3 and 4 remains substantially constant (e.g., without a significant change in volume) as the strut shrink piston 316 moves, slides, and/or lifts the inner cylinder 314 relative to the outer cylinder 312 away from an unshrunk position and toward a shrunk position.

The strut gas volume 322 of FIGS. 3 and 4 includes and/or is a volume of pressurized gas (e.g., nitrogen). In the illustrated example of FIGS. 3 and 4, the strut gas volume 322 includes and/or is approximately twelve hundred cubic inches (1200 in$^3$) of nitrogen gas pre-charged at approximately two hundred twenty-five pounds per square inch gauge (225 psig) with the landing gear strut 302 in the unshrunk position. The strut gas volume 322 of FIGS. 3 and 4 is in fluid communication with the strut liquid volume 320, and is also in fluid communication with the second port 326 of the landing gear strut 302. In some examples, the strut gas volume 322 includes a volume of pressurized gas that has been received from, that is to be transferred to, and/or that is to be exchanged with a volume of pressurized gas associated with the pressure vessel 304 of FIGS. 3 and 4, as further described below. In some such examples, the strut gas volume 322 may have been received from, may be transferred to, and/or may be exchanged with the volume of gas associated with the pressure vessel 304 via the second port 326 of the landing gear strut 302, and/or via the pressure-operated check valve 306 of FIGS. 3 and 4.

The pressure vessel 304 of FIGS. 3 and 4 includes an example vessel gas volume 328, an example pressure gauge 330, an example first port 332, and an example second port 334. In some examples, the pressure vessel 304 may be rigidly and/or fixedly coupled and/or mounted to an aircraft structure (e.g., a spar, a strut, a panel, etc.) located and/or positioned within a landing gear well and/or a wing of the aircraft, as shown in FIG. 4. In some examples, the pressure vessel 304 is a filament wound pressure vessel. The pressure vessel 304 may be of any size and/or shape, including the relative size and shape shown in FIG. 4.

The vessel gas volume 328 of FIGS. 3 and 4 includes and/or is a volume of pressurized gas (e.g., nitrogen). In the illustrated example of FIGS. 3 and 4, the vessel gas volume 328 includes and/or is approximately one thousand cubic inches (1000 in$^3$) of nitrogen gas pre-charged at approximately two hundred twenty-five pounds per square inch gauge (225 psig) with the landing gear strut 302 in the unshrunk position. The pressure gauge 330 of FIGS. 3 and 4 is operatively coupled to the vessel gas volume 328 and/or, more generally, to the pressure vessel 304 of FIGS. 3 and 4 such that the pressure gauge 330 measures and/or detects the pressure of the vessel gas volume 328.

The vessel gas volume 328 of FIGS. 3 and 4 is in fluid communication with the first port 332 and the second port 334 of the pressure vessel 304. In some examples, the vessel gas volume 328 includes a volume of pressurized gas received from the first port 332 of the pressure vessel 304. In the illustrated example of FIGS. 3 and 4, the first port 332 of the pressure vessel 304 is a fill and/or servicing port. In some examples, the vessel gas volume 328 of the pressure vessel 304 of FIGS. 3 and 4 is to be exchanged with (e.g., received from or transferred to) the strut gas volume 322 of the landing gear strut 302 of FIGS. 3 and 4. In some such examples, the vessel gas volume 328 of the pressure vessel 304 may be exchanged with the strut gas volume 322 of the landing gear strut 302 in response to actuation of the pressure-operated check valve 306 of FIGS. 3 and 4 via pressurized hydraulic fluid supplied to a port of the pressure-operated check valve 306 from the aircraft hydraulics 310.

The pressure-operated check valve 306 of FIGS. 3 and 4 includes an example first port 336, an example second port 338, and an example third port 340. In the illustrated example of FIGS. 3 and 4, the first port 336 of the pressure-operated check valve 306 is in fluid communication with the aircraft hydraulics 310 of FIGS. 3 and 4, the second port 338 of the pressure-operated check valve 306 is in fluid communication with the pressure vessel 304 of FIGS. 3 and 4, and the third port 340 of the pressure-operated check valve 306 is in fluid communication with the landing gear strut 302. In some examples, the pressure-operated check valve 306 may be rigidly and/or fixedly coupled and/or mounted to the outer cylinder 312 of the landing gear strut 302 such that the third port 340 of the pressure-operated check valve 306 directly interfaces with, and/or is directly coupled to, the second port 326 of the landing gear strut 302, as shown in FIGS. 3 and 4.

In the illustrated example of FIGS. 3 and 4, the pressure-operated check valve 306 may be actuated from a closed position to an open position in response to a pressurized supply of hydraulic fluid received at the first port 336 of the pressure-operated check valve 306 from the aircraft hydraulics 310 of FIGS. 3 and 4. In some examples, the pressure-operated check valve 306 of FIGS. 3 and 4 may be actuated to an open position during shrinking of the inner cylinder 314 of the landing gear strut 302 relative to the outer cylinder 312 of the landing gear strut 302. When the pressure-operated check valve 306 of FIGS. 3 and 4 is in the open position (e.g., when pressurized hydraulic fluid is received at the first port 336 of the pressure-operated check valve 306), the strut gas volume 322 of the landing gear strut 302 of FIGS. 3 and 4 is able to be transferred to and/or exchanged with the vessel gas volume 328 of the pressure vessel 304 of FIGS. 3 and 4.

For example, when the pressure-operated check valve 306 of FIGS. 3 and 4 is in the open position during the shrinking of the inner cylinder 314 of the landing gear strut 302 relative to the outer cylinder 312 of the landing gear strut 302, pressurized gas from the strut gas volume 322 of the landing gear strut 302 may pass from the second port 326 of the landing gear strut 302, through the third port 340 and the second port 338 of the pressure-operated check valve 306, through the second port 334 of the pressure vessel 304, and into the vessel gas volume 328 of the pressure vessel 304 of FIGS. 3 and 4. In the illustrated example of FIGS. 3 and 4, the addition of pressurized gas from the strut gas volume 322 to the vessel gas volume 328 approximately doubles the total gas volume contained within the pressure vessel 304 of FIGS. 3 and 4, thereby significantly lowering the compression force of the gas and the hydraulic pressure required to shrink the inner cylinder 314 of the landing gear strut 302 relative to the outer cylinder 312 of the landing gear strut 302. During the unshrinking of the inner cylinder 314 of the landing gear strut 302 relative to the outer cylinder 312 of the landing gear strut 302, the increased volume of pressurized gas contained within the pressure vessel 304 may pass from the second port 334 of the pressure vessel 304, through the second port 338 and the third port 340 of the pressure-operated check valve 306, through the second port 326 of the landing gear strut 302, and into the strut gas volume 322 of the landing gear strut 302 of FIGS. 3 and 4.

In some examples, the pressure-operated check valve 306 of FIGS. 3 and 4 may be actuated to and/or maintained in a closed position during landing of an aircraft implementing the hydraulic shrink system 300 of FIGS. 3 and 4 to provide normal dynamic functions associated with the landing gear strut 302 (e.g., as would be the case for a conventional landing gear strut lacking a shrink function). When the pressure-operated check valve 306 of FIGS. 3 and 4 is in the closed position (e.g., when pressurized hydraulic fluid is not received at the first port 336 of the pressure-operated check valve 306), pressurized gas from the strut gas volume 322 of the landing gear strut 302 of FIGS. 3 and 4 is blocked and/or prevented from being transferred to and/or exchanged with the vessel gas volume 328 of the pressure vessel 304 of FIGS. 3 and 4.

Figure 5:
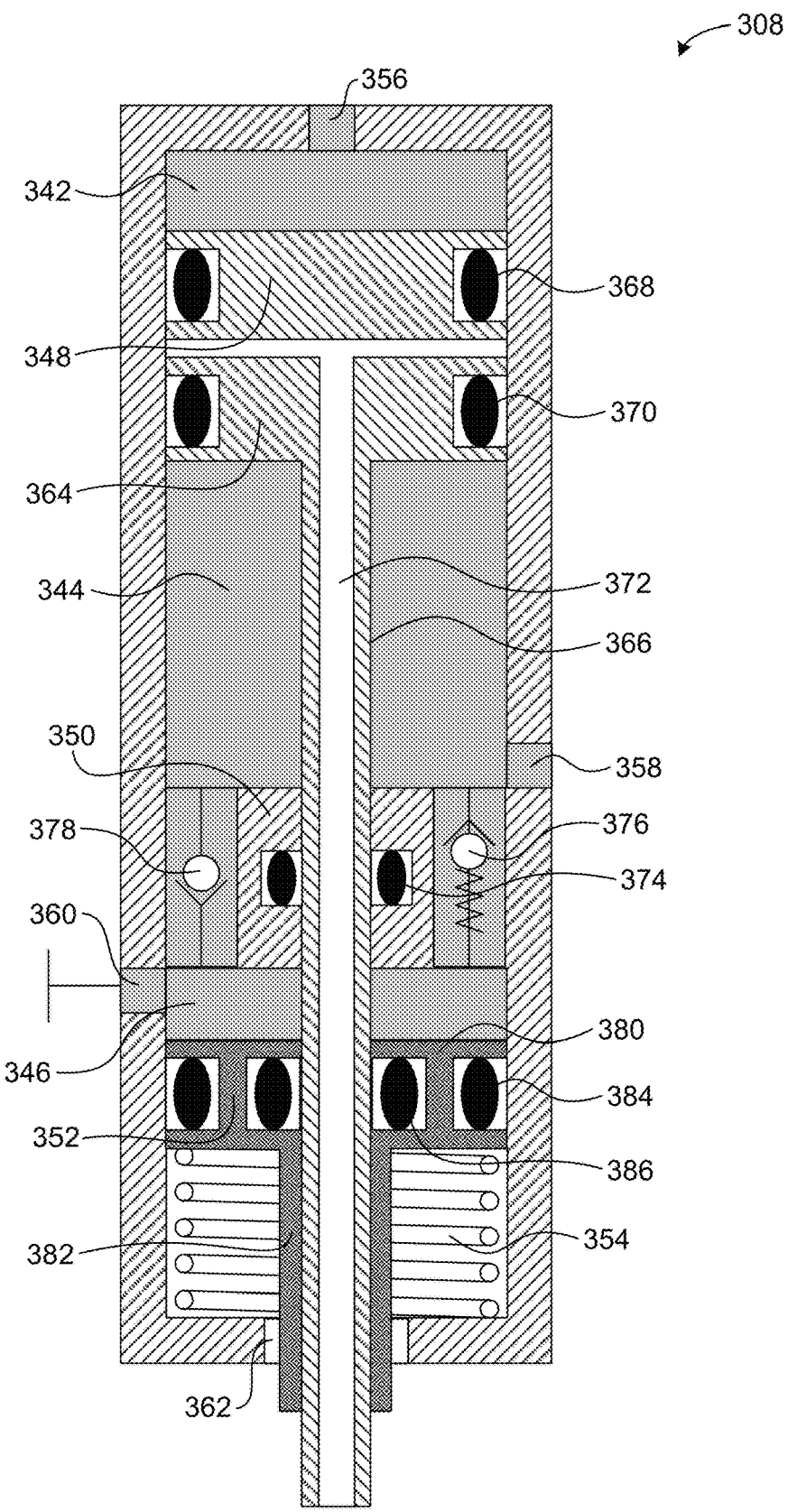
FIG. 5 is an enlarged cross-sectional view of the example transfer cylinder of the first example hydraulic shrink system of FIGS. 3 and 4.

The transfer cylinder 308 of FIGS. 3 and 4 includes an example cylinder actuation volume 342, an example cylinder shrink volume 344, an example cylinder compensator volume 346, an example cylinder shrink piston 348, an example bulkhead 350, an example compensator piston 352, an example compensator spring 354, an example first port 356, an example second port 358, an example third port 360, and an example opening 362. FIG. 5 is an enlarged cross-sectional view of the example transfer cylinder 308 of the first example hydraulic shrink system 300 of FIGS. 3 and 4. In some examples, the transfer cylinder 308 may be rigidly and/or fixedly coupled and/or mounted to the outer cylinder 312 of the landing gear strut 302, as shown in FIG. 4.

The cylinder actuation volume 342 of FIGS. 3-5 includes and/or is a volume of pressurized hydraulic fluid (e.g., BMS 3-11 hydraulic fluid) in liquid form. In the illustrated example of FIGS. 3-5, the cylinder actuation volume 342 is in fluid communication with the first port 356 of the transfer cylinder 308. In some examples, the cylinder actuation volume 342 includes a volume of pressurized hydraulic fluid received from the aircraft hydraulics 310 of FIGS. 3 and 4 via the first port 356 of the transfer cylinder 308. Increasing the cylinder actuation volume 342 of FIGS. 3-5 (e.g., increasing the volume of the pressurized hydraulic fluid of the cylinder actuation volume 342) causes the cylinder shrink piston 348 of FIGS. 3-5 to move and/or slide toward the bulkhead 350 of FIGS. 3-5 to compress and/or reduce the cylinder shrink volume 344 of FIGS. 3 and 5. Decreasing the cylinder actuation volume 342 of FIGS. 3-5 (e.g., decreasing the volume of the pressurized hydraulic fluid of the cylinder actuation volume 342) causes the cylinder shrink piston 348 of FIGS. 3-5 to move and/or slide away from the bulkhead 350 of FIGS. 3-5 to expand and/or increase the cylinder shrink volume 344 of FIGS. 3 and 5. In the illustrated example of FIGS. 3-5, the cylinder actuation volume 342 has a minimum volume when the landing gear strut 302 of FIGS. 3 and 4 is in the unshrunk position (e.g., as is generally shown in FIG. 3), and has a maximum volume when the landing gear strut 302 of FIGS. 3 and 4 is in the shrunk position.

The cylinder shrink volume 344 of FIGS. 3-5 includes and/or is a volume of pressurized hydraulic fluid (e.g., BMS 3-11 hydraulic fluid) in liquid form. The cylinder shrink volume 344 is isolated from the cylinder actuation volume 342 via the cylinder shrink piston 348 of FIGS. 3-5 described below. In the illustrated example of FIGS. 3-5, the cylinder shrink volume 344 is in fluid communication with the second port 358 of the transfer cylinder 308. In some examples, the cylinder shrink volume 344 includes a volume of pressurized hydraulic fluid to be transferred to and/or exchanged with the strut shrink volume 318 of the landing gear strut 302 of FIGS. 3 and 4 via the second port 358 of the transfer cylinder 308 and via the first port 324 of the landing gear strut 302. Decreasing the cylinder shrink volume 344 of FIGS. 3-5 (e.g., decreasing the volume of the pressurized hydraulic fluid of the cylinder shrink volume 344) increases the strut shrink volume 318 of FIGS. 3 and 4. Increasing the cylinder shrink volume 344 of FIGS. 3-5 (e.g., increasing the volume of the pressurized hydraulic fluid of the cylinder shrink volume 344) decreases the strut shrink volume 318 of FIGS. 3 and 4. In the illustrated example of FIGS. 3-5, the cylinder shrink volume 344 has a maximum volume when the landing gear strut 302 of FIGS. 3 and 4 is in the unshrunk position (e.g., as is generally shown in FIG. 3), and has a minimum volume when the landing gear strut 302 of FIGS. 3 and 4 is in the shrunk position.

The cylinder compensator volume 346 of FIGS. 3-5 5 includes and/or is a volume of pressurized hydraulic fluid (e.g., BMS 3-11 hydraulic fluid) in liquid form. The cylinder compensator volume 346 is exchangeable with the cylinder shrink volume 344 via the bulkhead 350 described below. The cylinder compensator volume 346 is in fluid communication with the third port 360 of the transfer cylinder 308. In the illustrated example of FIGS. 3-5, the third port 360 of the transfer cylinder 308 is a fill and/or bleed port via which the cylinder compensator volume 346 may be adjusted (e.g., increased in volume or decreased in volume).

The cylinder shrink piston 348 of FIGS. 3-5 is movably and/or slidably positioned in the transfer cylinder 308 of FIGS. 3-5 between the cylinder actuation volume 342 and the cylinder shrink volume 344. The cylinder shrink piston 348 moves and/or slides within the transfer cylinder 308 in response to changes in volume of the cylinder actuation volume 342 and/or the cylinder shrink volume 344. In some examples, the cylinder shrink volume 344 and the strut shrink volume 318 are respectively sized such that a stroke of the cylinder shrink piston 348 results in the inner cylinder 314 of the landing gear strut 302 being moved (e.g., shrunk) relative to the outer cylinder 312 of the landing gear strut 302 by a fixed shrink distance. In the illustrated example of FIGS. 3-5, the cylinder shrink piston 348 includes an example body 364, an example shaft 366, an example upper seal 368, an example lower seal 370, and an example drain path 372.

The body 364 of the cylinder shrink piston 348 of FIGS. 3-5 substantially fills the width and/or inner circumference of the transfer cylinder 308. The shaft 366 of the cylinder shrink piston 348 extends from the body 364 of the cylinder shrink piston 348 along the length of the transfer cylinder 308. In the illustrated example of FIGS. 3-5, the shaft 366 of the cylinder shrink piston 348 passes through the bulkhead 350, through the compensator piston 352, through the compensator spring 354, and though the opening 362 of the transfer cylinder 308.

The upper seal 368 and the lower seal 370 of the cylinder shrink piston 348 of FIGS. 3-5 are coupled to, disposed on, and/or carried by the body 364 of the cylinder shrink piston 348. The upper seal 368 and the lower seal 370 provide interfaces and/or seals between the body 364 of the cylinder shrink piston 348 and the inner surface of the transfer cylinder 308 to isolate the cylinder actuation volume 342 of FIGS. 3-5 from the cylinder shrink volume 344 of FIGS. 3-5. The drain path 372 of the cylinder shrink piston 348 of FIGS. 3-5 has a first portion located in the body 364 of the cylinder shrink piston 348 between the upper seal 368 and the lower seal 370, and a second portion extending from the first portion and located in the shaft 366 of the cylinder shrink piston 348. The second portion of the drain path 372 extends along the full length of the shaft 366 of the cylinder shrink piston 348 such that the drain path 372 passes through the bulkhead 350, through the compensator piston 352, through the compensator spring 354, and though the opening 362 of the transfer cylinder 308. In the illustrated example of FIGS. 3-5, the drain path 372 enables pressurized hydraulic fluid from the cylinder actuation volume 342 that may leak past the upper seal 368 (e.g., in the event of a failure of the upper seal 368) to be drained and/or removed from the transfer cylinder 308 without the leaked hydraulic fluid being mixed with and/or added to the cylinder shrink volume 344.

The bulkhead 350 of FIGS. 3-5 is rigidly and/or fixedly positioned in the transfer cylinder 308 of FIGS. 3-5 between the cylinder shrink volume 344 and the cylinder compensator volume 346. In the illustrated example of FIGS. 3-5, the bulkhead 350 is positioned between the second port 358 and the third port 360 of the transfer cylinder 308. The bulkhead 350 of FIGS. 3-5 substantially fills the width and/or inner circumference of the transfer cylinder 308 and controls the exchange of pressurized hydraulic fluid between the cylinder shrink volume 344 of FIGS. 3-5 and the cylinder compensator volume 346 of FIGS. 3-5. In the illustrated example of FIGS. 3-5, the bulkhead 350 includes an example seal 374, an example relief valve 376, and an example check valve 378.

The seal 374 of the bulkhead 350 of FIGS. 3-5 is coupled to, disposed on, and/or carried by the bulkhead 350. The seal 374 provides an interface and/or seal between the bulkhead 350 and the outer surface of the shaft 366 of the cylinder shrink piston 348 to isolate the cylinder shrink volume 344 of FIGS. 3-5 from the cylinder compensator volume 346 of FIGS. 3-5. The relief valve 376 and the check valve 378 of the bulkhead 350 enable pressurized hydraulic fluid to be exchanged between the cylinder shrink volume 344 of FIGS. 3-5 and the cylinder compensator volume 346 of FIGS. 3-5.

For example, pressurized hydraulic fluid may pass from the cylinder shrink volume 344 into the cylinder compensator volume 346 via the relief valve 376 of the bulkhead 350 of FIGS. 3-5 at a pressure greater than a supply pressure of the aircraft hydraulics 310 of FIGS. 3 and 4 but below a dynamic damping pressure imposed on the hydraulic fluid in the strut shrink volume 318 and/or the cylinder shrink volume 344 of FIGS. 3-5 during touchdown and/or taxiing of an aircraft implementing the hydraulic shrink system 300 of FIGS. 3 and 4. This function of the relief valve 376 resets the strut shrink volume 318 and/or the cylinder shrink volume 344 to the proper level(s) to ensure that the intended and/or desired extent of shrinkage of the inner cylinder 314 of the landing gear strut 302 relative to the outer cylinder 312 of the landing gear strut 302 is obtained. As another example, pressurized hydraulic fluid may pass from the cylinder compensator volume 346 into the cylinder shrink volume 344 via the check valve 378 of the bulkhead 350 of FIGS. 3-5. This function of the check valve 378 enables replenishment of hydraulic fluid to the cylinder shrink volume 344 and/or the strut shrink volume 318 due to normal operation or thermal contraction of the hydraulic fluid at low temperatures.

The compensator piston 352 of FIGS. 3-5 is movably and/or slidably positioned in the transfer cylinder 308 of FIGS. 3-5 between the cylinder compensator volume 346 and the compensator spring 354. The compensator spring 354 of FIGS. 3-5 biases the compensator piston 352 toward the bulkhead 350. The compensator piston 352 moves and/or slides within the transfer cylinder 308 in response to the biasing of the compensator spring 354, and/or in response to a change in volume of the cylinder compensator volume 346. In the illustrated example of FIGS. 3-5, the compensator piston 352 includes an example body 380, an example shaft 382, an example outer seal 384, and an example inner seal 386.

The body 380 of the compensator piston 352 of FIGS. 3-5 substantially fills the width and/or inner circumference of the transfer cylinder 308. The shaft 382 of the compensator piston 352 extends from the body 380 of the compensator piston 352 along the length of the transfer cylinder 308. The shaft 382 of the compensator piston 352 passes through the compensator spring 354 and though the opening 362 of the transfer cylinder 308. In the illustrated example of FIGS. 3-5, the shaft 382 of the compensator piston 352 circumscribes and/or surrounds the shaft 366 of the cylinder shrink piston 348 such that the shaft 366 of the cylinder shrink piston 348 is movable and/or slidable within the shaft 382 of the compensator piston 352.

The outer seal 384 of the compensator piston 352 of FIGS. 3-5 is coupled to, disposed on, and/or carried by the body 380 of the compensator piston 352. The outer seal 384 provides an interface and/or seal between the body 380 of the compensator piston 352 and the inner surface of the transfer cylinder 308 to isolate the cylinder compensator volume 346 of FIGS. 3-5 from the opening 362 of the transfer cylinder 308 of FIGS. 3-5. The inner seal 386 of the compensator piston 352 of FIGS. 3-5 is also coupled to, disposed on, and/or carried by the body 380 of the compensator piston 352. The inner seal 386 provides an interface and/or seal between the body 380 of the compensator piston 352 and the outer surface of the shaft 366 of the cylinder shrink piston 348 to further isolate the cylinder compensator volume 346 of FIGS. 3-5 from the opening 362 of the transfer cylinder 308 of FIGS. 3-5.

In the illustrated example of FIGS. 3-5, the shaft 366 of the cylinder shrink piston 348 and the shaft 382 of the compensator piston 352 both extend and/or protrude from the transfer cylinder 308 via the opening 362 of the transfer cylinder 308, with the shaft 382 of the compensator piston 352 circumscribing and/or surrounding the shaft 366 of the cylinder shrink piston 348. In some examples, leakage of hydraulic fluid from the drain path 372 of the shaft 366 of the cylinder shrink piston 348 may indicate a failure of the upper seal 368 and/or the lower seal 370 of the cylinder shrink piston 348. In some examples, leakage of hydraulic fluid from between the shaft 366 of the cylinder shrink piston 348 and the shaft 382 of the compensator piston 352 may indicate a failure of the inner seal 386 of the compensator piston 352. In some examples, leakage of hydraulic fluid from the cylinder shrink volume 344 to the cylinder compensator volume 346 may indicate a failure of the outer seal 384 of the compensator piston 352. In some examples, the length of the protrusion of the shaft 382 of the compensator piston 352 from the opening 362 of the transfer cylinder 308 provides an indication of leakage and/or the need to service the hydraulic fluid via the third port 360 of the transfer cylinder 308.

The aircraft hydraulics 310 of FIGS. 3 and 4 control the above-described functions and/or operations of the hydraulic shrink system 300 of FIGS. 3 and 4 associated with shrinking and/or unshrinking the inner cylinder 314 of the landing gear strut 302 relative to the outer cylinder 312 of the landing gear strut 302. In the illustrated example of FIGS. 3 and 4, the aircraft hydraulics 310 include an example supply pressure source 388, an example check valve 390, an example motor-operated valve 392, an example flow regulator 394, an example return circuit 396, and an example relief valve 398. In some examples, the aircraft hydraulics 310 of FIGS. 3 and 4 may be controlled via an example shrink control system as disclosed in U.S. patent application Ser. No. 15/809,397 filed on Nov. 10, 2017, and titled "Methods and Apparatus for Controlling Landing Gear Shrink," the entirety of which is hereby incorporated by reference. For example, the motor-operated valve 392 of the aircraft hydraulics 310 of FIGS. 3 and 4 may be actuated between a first position and a second position in response to a shrink command and/or an unshrink command generated by an example shrink control system as disclosed in U.S. patent application Ser. No. 15/809,397.

The supply pressure source 388 of the aircraft hydraulics 310 of FIGS. 3 and 4 supplies, delivers, and/or provides pressurized hydraulic fluid to the check valve 390 of the aircraft hydraulics 310. Pressurized hydraulic fluid that passes from the supply pressure source 388 through the check valve 390 of the aircraft hydraulics 310 is subsequently supplied, delivered, and/or provided to the motor-operated valve 392 of the aircraft hydraulics 310. The check valve 390 of the aircraft hydraulics 310 blocks and/or prevents pressurized hydraulic fluid supplied, delivered, and/or provided to the motor-operated valve 392 from flowing backward through the check valve 390 to the supply pressure source 388.

In the illustrated example of FIGS. 3 and 4, the motor-operated valve 392 of the aircraft hydraulics 310 is an electrically-actuated, three-way, two-position valve. The motor-operated valve 392 includes a flow control member (e.g., a disc, a plug, a ball, etc.) that is movable between an open position and a closed position. In some examples, the flow control member of the motor-operated valve 392 of FIGS. 3 and 4 is actuated to a commanded position (e.g., an open position associated with a shrink command, or a closed position associated with an unshrink command) in response to electrical power supplied to the motor-operated valve 392. In some examples, the flow control member of the motor-operated valve 392 of FIGS. 3 and 4 remains in the commanded position once the supplied electrical power has been removed from the motor-operated valve 392.

In some examples (e.g., subsequent to and/or in connection with a takeoff procedure of an aircraft), the flow control member of the motor-operated valve 392 of FIGS. 3 and 4 may be actuated and/or moved from a closed position to an open position in response to a shrink command received at the motor-operated valve 392. When the flow control member of the motor-operated valve 392 of FIGS. 3 and 4 is in the open position, pressurized hydraulic fluid supplied via the supply pressure source 388 passes through the check valve 390 of FIGS. 3 and 4 to the motor-operated valve 392, and through the motor-operated valve 392 (e.g., from port "P" to port "S" as shown in FIG. 3) to the flow regulator 394 of FIGS. 3 and 4. When positioned in the open position, the flow control member of the motor-operated valve 392 blocks and/or prevents the pressurized hydraulic fluid supplied by the supply pressure source 388 from passing to the return circuit 396 of the aircraft hydraulic 310. In some examples, the relief valve 398 of the aircraft hydraulics 310 prevents over pressurization associated with thermal expansion at the supply side of the hydraulic shrink system 300 of FIGS. 3 and 4 by dumping pressurized hydraulic fluid to the return circuit 396.

In the illustrated example of FIGS. 3 and 4, the flow regulator 394 of the aircraft hydraulics 310 controls the speed and/or rate at which the inner cylinder 314 of the landing gear strut 302 shrinks relative to the outer cylinder 312 of the landing gear strut 302. After passing through the flow regulator 394, the flow of the pressurized hydraulic fluid is divided between the first port 356 of the transfer cylinder 308 and the first port 336 of the pressure-operated check valve 306 of FIGS. 3 and 4. The flow of the pressurized hydraulic fluid into the first port 356 of the transfer cylinder 308 increases the volume of the cylinder actuation volume 342 of the transfer cylinder 308. In response to the increase in volume of the cylinder actuation volume 342, the cylinder shrink piston 348 of the transfer cylinder 308 moves and/or slides toward the bulkhead 350 of the transfer cylinder 308, thereby decreasing the volume of the cylinder shrink volume 344 of the transfer cylinder 308. The volume of the strut shrink volume 318 of the landing gear strut 302 increases in response to the decrease in volume of the cylinder shrink volume 344 of the transfer cylinder 308. In response to the increase in the volume of the strut shrink volume 318, the strut shrink piston 316 moves, slides, and/or lifts the inner cylinder 314 of the landing gear strut 302 relative to the outer cylinder 312 of the landing gear strut 302 to shrink the landing gear strut 302.

The flow of the pressurized hydraulic fluid into the first port 336 of the pressure-operated check valve 306 of FIGS. 3 and 4 occurs simultaneously with the flow of the pressurized hydraulic fluid into the first port 356 of the transfer cylinder 308 described above. The pressure-operated check valve 306 is accordingly actuated to an open position during (e.g., simultaneously with) the shrinking of the landing gear strut 302. When the pressure-operated check valve 306 is actuated to the open position, pressurized gas from the strut gas volume 322 is added to the vessel gas volume 328 to approximately double the total gas volume contained within the pressure vessel 304 of FIGS. 3 and 4, thereby significantly lowering the compression force of the gas and the hydraulic pressure required to shrink the inner cylinder 314 of the landing gear strut 302 relative to the outer cylinder 312 of the landing gear strut 302. In some examples, the divided and/or simultaneous flow of pressurized hydraulic fluid into the first port 356 of the transfer cylinder 308 and the first port 336 of the pressure-operated check valve 306 is continuously maintained once the shrinking of the landing gear strut 302 is complete and electrical power to the motor-operated valve 392 is removed.

In some examples (e.g., prior to and/or in connection with a landing procedure of an aircraft), the flow control member of the motor-operated valve 392 of FIGS. 3 and 4 may be actuated and/or moved from the open position to the closed position in response to an unshrink command received at the motor-operated valve 392. When the flow control member of the motor-operated valve 392 of FIGS. 3 and 4 is in the closed position, pressurized hydraulic fluid that may have previously been provided via the supply pressure source 388, through the check valve 390, and through the motor-operated valve 392 (e.g., when the motor-operated valve 392 is in the open position) may be freely returned through the motor-operated valve 392 (e.g., from port "S" to port "R" as shown in FIG. 3) to the return circuit 396 of the aircraft hydraulics 310 of FIGS. 3 and 4. When positioned in the closed position, the flow control member of the motor-operated valve 392 blocks and/or prevents the pressurized hydraulic fluid being delivered to the return circuit 396 from passing to the supply pressure source 388 of the aircraft hydraulic 310.

In some examples, the inner cylinder 314 of the landing gear strut 302 moves, slides, and/or is lowered relative to the outer cylinder 312 of the landing gear strut 302 to unshrink the landing gear strut 302 when the flow control member of the motor-operated valve 392 is in the closed position. In some examples, the landing gear strut 302 may unshrink based on the compressive forces of the combined vessel gas volume 328 and strut gas volume 322. In some examples, the landing gear strut 302 may unshrink based further on the weight of the inner cylinder 314 of the landing gear strut 302, which may include the weight of the wheels, tires, and other structures coupled to the inner cylinder 314 of the landing gear strut 302. As the inner cylinder 314 of the landing gear strut 302 moves, slides, and/or is lowered relative to the outer cylinder 312 of the landing gear strut 302 in connection with the unshrinking of the landing gear strut 302, the strut shrink piston 316 of FIGS. 3 and 4 decrease the volume of the strut shrink volume 318 of the landing gear strut 302, which in turn increases the volume of the cylinder shrink volume 344 of the transfer cylinder 308. The cylinder actuation volume 342 of the transfer cylinder 308 decreases in response to the increase in volume of the cylinder shrink volume 344, thereby resulting in pressurized hydraulic fluid being forced from the cylinder actuation volume 342 through the first port 356 of the transfer cylinder 308 to the flow regulator 394, through the flow regulator 394 to the motor-operated valve 392, and through the motor-operated valve 392 to the return circuit 396 of the aircraft hydraulics 310 of FIGS. 3 and 4.

Figure 6:
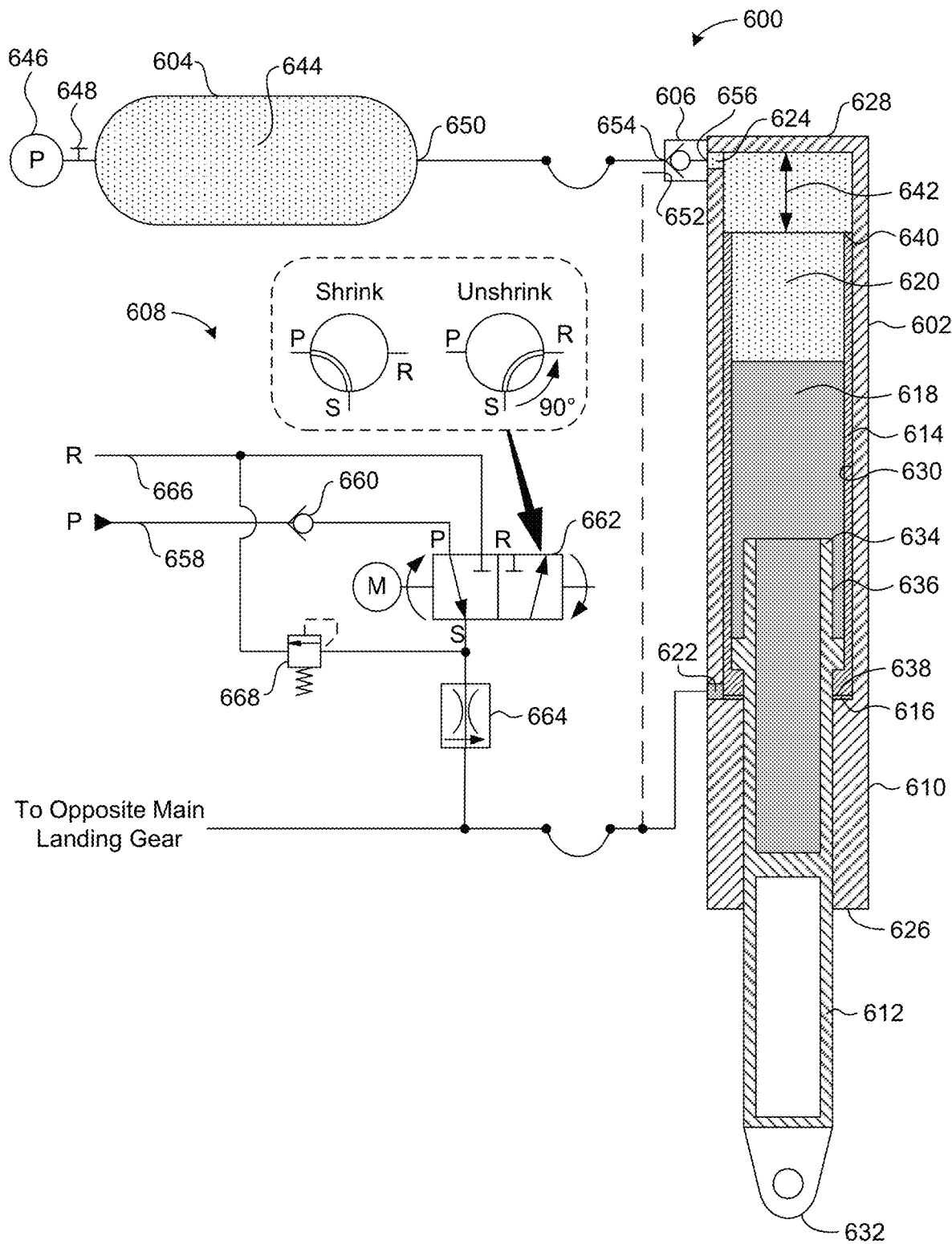
FIG. 6 is a schematic of a second example hydraulic shrink system constructed in accordance with the teachings of this disclosure.
Figure 7:
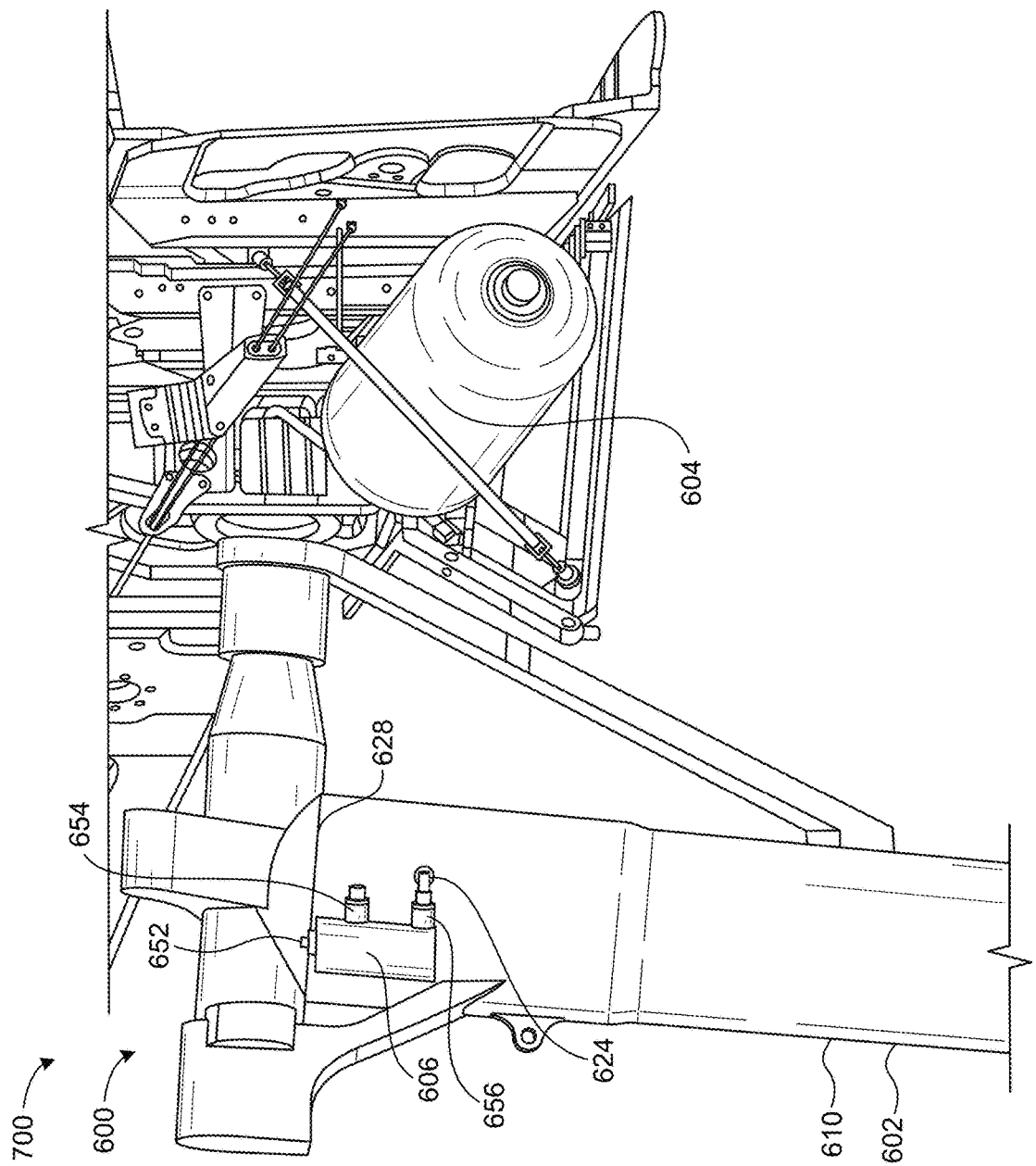
FIG. 7 illustrates an example implementation of the second example hydraulic shrink system of FIG. 6.

FIG. 6 is a schematic of a second example hydraulic shrink system 600 constructed in accordance with the teachings of this disclosure. FIG. 7 illustrates an example implementation 700 of the second example hydraulic shrink system 600 of FIG. 6. In the illustrated example of FIGS. 6 and 7, the hydraulic shrink system 600 includes an example landing gear strut 602, an example pressure vessel 604, an example pressure-operated check valve 606, and example aircraft hydraulics 608. The landing gear strut 602 is operatively coupled to the pressure-operated check valve 606 and the aircraft hydraulics 608. The pressure vessel 604 is operatively coupled to the pressure-operated check valve 606. The pressure-operated check valve 606 is operatively coupled to the landing gear strut 602, the pressure vessel 604, and the aircraft hydraulics 608. The aircraft hydraulics 608 are operatively coupled to the landing gear strut 602 and the pressure-operated check valve 606.

In some examples, one or more of the operative coupling(s) described above may be facilitated and/or implemented via one or more rigid and/or flexible conduit(s) and/or pressure line(s) extending between various ones of the identified structures. For example, the aircraft hydraulics 608 of FIGS. 6 and 7 may be operatively coupled to the landing gear strut 602 of FIGS. 6 and 7 via one or more rigid and/or flexible conduit(s) structured to carry and/or convey hydraulic fluid between the aircraft hydraulics 608 and the landing gear strut 602. In other examples, one or more of the operative coupling(s) described above may be facilitated and/or implemented via one or more direct connection(s) between various ones of the identified structures, where the direct connection(s) do/does not include a separate conduit and/or pressure line extending between the structures.

The landing gear strut 602 of FIGS. 6 and 7 includes an example outer cylinder 610, an example inner cylinder 612, an example strut shrink piston 614, an example strut shrink volume 616, an example strut liquid volume 618, an example strut gas volume 620, an example first port 622, and an example second port 624. The outer cylinder 610 includes an example first end 626, an example second end 628 located opposite the first end 626 of the outer cylinder 610, and an example inner surface 630. The outer cylinder 610 has a fixed length generally defined as the distance between the first end 626 and the second end 628 of the outer cylinder 610. The inner cylinder 612 includes an example first end 632, an example second end 634 located opposite the first end 632 of the inner cylinder 612, and an example outer surface 636 The inner cylinder 612 has a fixed length generally defined as the distance between the first end 632 and the second end 634 of the inner cylinder 612. The inner cylinder 612 is positioned, disposed, and/or received within the outer cylinder 610 and is movable and/or slidable relative to the outer cylinder 610 between an unshrunk position and a shrunk position. In some examples, the landing gear strut 602 of FIGS. 6 and 7 has a first length when the inner cylinder 612 is in the unshrunk position relative to the outer cylinder 610, and a second length less than the first length when the inner cylinder 612 is in the shrunk position relative to the outer cylinder 610.

The strut shrink piston 614 of FIGS. 6 and 7 is located and/or positioned between the outer cylinder 610 and the inner cylinder 612 within the strut shrink volume 616 of FIGS. 6 and 7. In the illustrated example of FIGS. 6 and 7, the strut shrink piston 614 has an annular shape such that the strut shrink piston 614 surrounds and/or circumscribes the outer surface 636 of the inner cylinder 612 while also being positioned within the inner surface 630 of the outer cylinder 610. In some examples, one or more seal(s) may be coupled to and/or disposed on the strut shrink piston 614. In such examples, the seal(s) of the strut shrink piston 614 may provide one or more interface(s) and/or a seal(s) between the inner surface 630 of the outer cylinder 610 and the outer surface 636 of the inner cylinder 612 to isolate the strut shrink volume 616 of FIGS. 6 and 7 from the strut liquid volume 618 of FIGS. 6 and 7.

The strut shrink piston 614 of FIGS. 6 and 7 includes an example first end 638 and an example second end 640 located opposite the first end 638 of the strut shrink piston 614. In the illustrated example of FIGS. 6 and 7, the strut shrink piston has an example travel limit 642 defined by a maximum distance between the second end 640 of the strut shrink piston 614 and the second end 628 of the outer cylinder 610. The travel limit 642 of the strut shrink piston 614 is reached and/or exhausted (e.g., reduced from the value of the maximum distance to a value of zero) when the second end 640 of the strut shrink piston 614 contacts the second end 628 of the outer cylinder 610 in connection with shrinking the landing gear strut 602. Such contact between the second end 640 of the strut shrink piston 614 and the second end 628 of the outer cylinder 610 prevents the strut shrink piston 614 from further moving, sliding, and/or lifting the inner cylinder 612 of the landing gear strut 602 relative to the outer cylinder 610 of the landing gear strut 602 in connection with shrinking the landing gear strut 602, as further described below. In some examples, one or more seal(s) may be coupled to and/or disposed on the strut shrink piston 614. In such examples, the seal(s) of the strut shrink piston 614 may provide an interface and/or a seal between the outer cylinder 610 and the inner cylinder 612 to isolate the strut shrink volume 616 of FIGS. 6 and 7 from the strut liquid volume 618 of FIGS. 6 and 7.

The strut shrink volume 616 of FIGS. 6 and 7 includes and/or is a volume of pressurized hydraulic fluid (e.g., BMS 3-11 hydraulic fluid) in liquid form. In the illustrated example of FIGS. 6 and 7, the strut shrink volume 616 is in fluid communication with the first port 622 of the landing gear strut 602. In some examples, the strut shrink volume 616 includes a volume of pressurized hydraulic fluid received from and/or to be exchanged with the aircraft hydraulics 608 of FIGS. 6 and 7 via the first port 622 of the landing gear strut 602.

Increasing the strut shrink volume 616 of FIGS. 6 and 7 (e.g., increasing the volume of the pressurized hydraulic fluid of the strut shrink volume 616) causes the strut shrink piston 614 of FIGS. 6 and 7 to move, slide, and/or lift the inner cylinder 612 of FIGS. 6 and 7 relative to the outer cylinder 610 of FIGS. 6 and 7 away from an unshrunk position and toward a shrunk position. In the illustrated example of FIGS. 6 and 7, movement of the strut shrink piston 614 is limited and/or restricted via the second end 628 of the outer cylinder 610 contacting the second end 640 of the strut shrink piston 614, and/or via the travel limit 642 described above. Once the travel limit 642 has been reached and/or exhausted (e.g., reduced from the value of the maximum distance to a value of zero), the strut shrink piston 614 blocks and/or prevents the strut shrink volume 616 from continuing to increase. Decreasing the strut shrink volume 616 of FIGS. 6 and 7 (e.g., decreasing the volume of the pressurized hydraulic fluid of the strut shrink volume 616) causes the strut shrink piston 614 of FIGS. 6 and 7 to move, slide, and/or lower the inner cylinder 612 of FIGS. 6 and 7 relative to the outer cylinder 610 of FIGS. 6 and 7 away from a shrunk position and toward an unshrunk position. In the illustrated example of FIGS. 6 and 7, the strut shrink volume 616 has a minimum volume (e.g., a volume of zero) when the inner cylinder 612 and/or, more generally, the landing gear strut 602 of FIGS. 6 and 7 is in the unshrunk position (e.g., as is generally shown in FIG. 6), and has a maximum volume when the inner cylinder 612 and/or, more generally, the landing gear strut 602 of FIGS. 6 and 7 is in the shrunk position.

The strut liquid volume 618 of FIGS. 6 and 7 includes and/or is a volume of pressurized hydraulic fluid (e.g., BMS 3-11 hydraulic fluid) in liquid form. In the illustrated example of FIGS. 6 and 7, the strut liquid volume 618 includes and/or is approximately eight hundred eighty cubic inches (880 in$^3$) of BMS 3-11 hydraulic fluid in liquid form. The strut liquid volume 618 of FIGS. 6 and 7 is isolated from the strut shrink volume 616 of FIGS. 6 and 7. Unlike the strut shrink volume 616 of FIGS. 6 and 7 described above, the strut liquid volume 618 of FIGS. 6 and 7 remains substantially constant (e.g., without a significant change in volume) as the strut shrink piston 614 moves, slides, and/or lifts the inner cylinder 612 relative to the outer cylinder 610 away from an unshrunk position and toward a shrunk position.

The strut gas volume 620 of FIGS. 6 and 7 includes and/or is a volume of pressurized gas (e.g., nitrogen). In the illustrated example of FIGS. 6 and 7, the strut gas volume 620 includes and/or is approximately twelve hundred cubic inches (1200 in$^3$) of nitrogen gas pre-charged at approximately two hundred twenty-five pounds per square inch gauge (225 psig) with the landing gear strut 602 in the unshrunk position. The strut gas volume 620 of FIGS. 6 and 7 is in fluid communication with the strut liquid volume 618, and is also in fluid communication with the second port 624 of the landing gear strut 602. In some examples, the strut gas volume 620 includes a volume of pressurized gas that has been received from, that is to be transferred to, and/or that is to be exchanged with a volume of pressurized gas associated with the pressure vessel 604 of FIGS. 6 and 7, as further described below. In some such examples, the strut gas volume 620 may have been received from, may be transferred to, and/or may be exchanged with the volume of gas associated with the pressure vessel 604 via the second port 624 of the landing gear strut 602, and/or via the pressure-operated check valve 606 of FIGS. 6 and 7.

The pressure vessel 604 of FIGS. 6 and 7 includes an example vessel gas volume 644, an example pressure gauge 646, an example first port 648, and an example second port 650. In some examples, the pressure vessel 604 may be rigidly and/or fixedly coupled and/or mounted to an aircraft structure (e.g., a spar, a strut, a panel, etc.) located and/or positioned within a landing gear well and/or a wing of the aircraft, as shown in FIG. 7. In some examples, the pressure vessel 604 is a filament wound pressure vessel. The pressure vessel 604 may be of any size and/or shape, including the relative size and shape shown in FIG. 7.

The vessel gas volume 644 of FIGS. 6 and 7 includes and/or is a volume of pressurized gas (e.g., nitrogen). In the illustrated example of FIGS. 6 and 7, the vessel gas volume 644 includes and/or is approximately one thousand cubic inches (1000 in$^3$) of nitrogen gas pre-charged at approximately two hundred twenty-five pounds per square inch gauge (225 psig) with the landing gear strut 602 in the unshrunk position. The pressure gauge 646 of FIGS. 6 and 7 is operatively coupled to the vessel gas volume 644 and/or, more generally, to the pressure vessel 604 of FIGS. 6 and 7 such that the pressure gauge 646 measures and/or detects the pressure of the vessel gas volume 644.

The vessel gas volume 644 of FIGS. 6 and 7 is in fluid communication with the first port 648 and the second port 650 of the pressure vessel 604. In some examples, the vessel gas volume 644 includes a volume of pressurized gas received from the first port 648 of the pressure vessel 604. In the illustrated example of FIGS. 6 and 7, the first port 648 of the pressure vessel 604 is a fill and/or servicing port. In some examples, the vessel gas volume 644 of the pressure vessel 604 of FIGS. 6 and 7 is to be exchanged with (e.g., received from or transferred to) the strut gas volume 620 of the landing gear strut 602 of FIGS. 6 and 7. In some such examples, the vessel gas volume 644 of the pressure vessel 604 may be exchanged with the strut gas volume 620 of the landing gear strut 602 in response to actuation of the pressure-operated check valve 606 of FIGS. 6 and 7 via pressurized hydraulic fluid supplied to a port of the pressure-operated check valve 606 from the aircraft hydraulics 608.

The pressure-operated check valve 606 of FIGS. 6 and 7 includes an example first port 652, an example second port 654, and an example third port 656. In the illustrated example of FIGS. 6 and 7, the first port 652 of the pressure-operated check valve 606 is in fluid communication with the aircraft hydraulics 608 of FIGS. 6 and 7, the second port 654 of the pressure-operated check valve 606 is in fluid communication with the pressure vessel 604 of FIGS. 6 and 7, and the third port 656 of the pressure-operated check valve 606 is in fluid communication with the landing gear strut 602. In some examples, the pressure-operated check valve 606 may be rigidly and/or fixedly coupled and/or mounted to the outer cylinder 610 of the landing gear strut 602 such that the third port 656 of the pressure-operated check valve 606 directly interfaces with, and/or is directly coupled to, the second port 624 of the landing gear strut 602, as shown in FIGS. 6 and 7.

In the illustrated example of FIGS. 6 and 7, the pressure-operated check valve 606 may be actuated from a closed position to an open position in response to a pressurized supply of hydraulic fluid received at the first port 652 of the pressure-operated check valve 606 from the aircraft hydraulics 608 of FIGS. 6 and 7. In some examples, the pressure-operated check valve 606 of FIGS. 6 and 7 may be actuated to an open position during shrinking of the inner cylinder 612 of the landing gear strut 602 relative to the outer cylinder 610 of the landing gear strut 602. When the pressure-operated check valve 606 of FIGS. 6 and 7 is in the open position (e.g., when pressurized hydraulic fluid is received at the first port 652 of the pressure-operated check valve 606), the strut gas volume 620 of the landing gear strut 602 of FIGS. 6 and 7 is able to be transferred to and/or exchanged with the vessel gas volume 644 of the pressure vessel 604 of FIGS. 6 and 7.

For example, when the pressure-operated check valve 606 of FIGS. 6 and 7 is in the open position during the shrinking of the inner cylinder 612 of the landing gear strut 602 relative to the outer cylinder 610 of the landing gear strut 602, pressurized gas from the strut gas volume 620 of the landing gear strut 602 may pass from the second port 624 of the landing gear strut 602, through the third port 656 and the second port 654 of the pressure-operated check valve 606, through the second port 650 of the pressure vessel 604, and into the vessel gas volume 644 of the pressure vessel 604 of FIGS. 6 and 7. In the illustrated example of FIGS. 6 and 7, the addition of pressurized gas from the strut gas volume 620 to the vessel gas volume 644 approximately doubles the total gas volume contained within the pressure vessel 604 of FIGS. 6 and 7, thereby significantly lowering the compression force of the gas and the hydraulic pressure required to shrink the inner cylinder 612 of the landing gear strut 602 relative to the outer cylinder 610 of the landing gear strut 602. During the unshrinking of the inner cylinder 612 of the landing gear strut 602 relative to the outer cylinder 610 of the landing gear strut 602, the increased volume of pressurized gas contained within the pressure vessel 604 may pass from the second port 650 of the pressure vessel 604, through the second port 654 and the third port 656 of the pressure-operated check valve 606, through the second port 624 of the landing gear strut 602, and into the strut gas volume 620 of the landing gear strut 602 of FIGS. 6 and 7.

In some examples, the pressure-operated check valve 606 of FIGS. 6 and 7 may be actuated to and/or maintained in a closed position during landing of an aircraft implementing the hydraulic shrink system 600 of FIGS. 6 and 7 to provide normal dynamic functions associated with the landing gear strut 602 (e.g., as would be the case for a conventional landing gear strut lacking a shrink function). When the pressure-operated check valve 606 of FIGS. 6 and 7 is in the closed position (e.g., when pressurized hydraulic fluid is not received at the first port 652 of the pressure-operated check valve 606), pressurized gas from the strut gas volume 620 of the landing gear strut 602 of FIGS. 6 and 7 is blocked and/or prevented from being transferred to and/or exchanged with the vessel gas volume 644 of the pressure vessel 604 of FIGS. 6 and 7.

The aircraft hydraulics 608 of FIGS. 6 and 7 control the above-described functions and/or operations of the hydraulic shrink system 600 of FIGS. 6 and 7 associated with shrinking and/or unshrinking the inner cylinder 612 of the landing gear strut 602 relative to the outer cylinder 610 of the landing gear strut 602. In the illustrated example of FIGS. 6 and 7, the aircraft hydraulics 608 include an example supply pressure source 658, an example check valve 660, an example motor-operated valve 662, an example flow regulator 664, an example return circuit 666, and an example relief valve 668. In some examples, the aircraft hydraulics 608 of FIGS. 6 and 7 may be controlled via an example shrink control system as disclosed in U.S. patent application Ser. No. 15/809,397 filed on Nov. 10, 2017, and titled "Methods and Apparatus for Controlling Landing Gear Shrink," the entirety of which is hereby incorporated by reference. For example, the motor-operated valve 662 of the aircraft hydraulics 608 of FIGS. 6 and 7 may be actuated between a first position and a second position in response to a shrink command and/or an unshrink command generated by an example shrink control system as disclosed in U.S. patent application Ser. No. 15/809,397.

The supply pressure source 658 of the aircraft hydraulics 608 of FIGS. 6 and 7 supplies, delivers, and/or provides pressurized hydraulic fluid to the check valve 660 of the aircraft hydraulics 608. Pressurized hydraulic fluid that passes from the supply pressure source 658 through the check valve 660 of the aircraft hydraulics 608 is subsequently supplied, delivered, and/or provided to the motor-operated valve 662 of the aircraft hydraulics 608. The check valve 660 of the aircraft hydraulics 608 blocks and/or prevents pressurized hydraulic fluid supplied, delivered, and/or provided to the motor-operated valve 662 from flowing backward through the check valve 660 to the supply pressure source 658.

In the illustrated example of FIGS. 6 and 7, the motor-operated valve 662 of the aircraft hydraulics 608 is an electrically-actuated, three-way, two-position valve. The motor-operated valve 662 includes a flow control member (e.g., a disc, a plug, a ball, etc.) that is movable between an open position and a closed position. In some examples, the flow control member of the motor-operated valve 662 of FIGS. 6 and 7 is actuated to a commanded position (e.g., an open position associated with a shrink command, or a closed position associated with an unshrink command) in response to electrical power supplied to the motor-operated valve 662. In some examples, the flow control member of the motor-operated valve 662 of FIGS. 6 and 7 remains in the commanded position once the supplied electrical power has been removed from the motor-operated valve 662.

In some examples (e.g., subsequent to and/or in connection with a takeoff procedure of an aircraft), the flow control member of the motor-operated valve 662 of FIGS. 6 and 7 may be actuated and/or moved from a closed position to an open position in response to a shrink command received at the motor-operated valve 662. When the flow control member of the motor-operated valve 662 of FIGS. 6 and 7 is in the open position, pressurized hydraulic fluid supplied via the supply pressure source 658 passes through the check valve 660 of FIGS. 6 and 7 to the motor-operated valve 662, and through the motor-operated valve 662 (e.g., from port "P" to port "S" as shown in FIG. 6) to the flow regulator 664 of FIGS. 6 and 7. When positioned in the open position, the flow control member of the motor-operated valve 662 blocks and/or prevents the pressurized hydraulic fluid supplied by the supply pressure source 658 from passing to the return circuit 666 of the aircraft hydraulic 608. In some examples, the relief valve 668 of the aircraft hydraulics 608 prevents over pressurization associated with thermal expansion at the supply side of the hydraulic shrink system 600 of FIGS. 6 and 7 by dumping pressurized hydraulic fluid to the return circuit 666.

In the illustrated example of FIGS. 6 and 7, the flow regulator 664 of the aircraft hydraulics 608 controls the speed and/or rate at which the inner cylinder 612 of the landing gear strut 602 shrinks relative to the outer cylinder 610 of the landing gear strut 602. After passing through the flow regulator 664, the flow of the pressurized hydraulic fluid is divided between the first port 622 of the landing gear strut 602 and the first port 652 of the pressure-operated check valve 606 of FIGS. 6 and 7. The flow of the pressurized hydraulic fluid into the first port 622 of the landing gear strut 602 increases the volume of the strut shrink volume 616 of the landing gear strut 602. In response to the increase in the volume of the strut shrink volume 616, the strut shrink piston 614 moves, slides, and/or lifts the inner cylinder 612 of the landing gear strut 602 relative to the outer cylinder 610 of the landing gear strut 602 to shrink the landing gear strut 602. Movement of the strut shrink piston 614 in connection with the shrinking of the landing gear strut 602 is restricted and/or limited via the second end 628 of the outer cylinder 610 contacting the second end 640 of the strut shrink piston 614, and/or via the travel limit 642, as shown in FIG. 6.

The flow of the pressurized hydraulic fluid into the first port 652 of the pressure-operated check valve 606 of FIGS. 6 and 7 occurs simultaneously with the flow of the pressurized hydraulic fluid into the first port 622 of the landing gear strut 602 described above. The pressure-operated check valve 606 is accordingly actuated to an open position during (e.g., simultaneously with) the shrinking of the landing gear strut 602. When the pressure-operated check valve 606 is actuated to the open position, pressurized gas from the strut gas volume 620 is added to the vessel gas volume 644 to approximately double the total gas volume contained within the pressure vessel 604 of FIGS. 6 and 7, thereby significantly lowering the compression force of the gas and the hydraulic pressure required to shrink the inner cylinder 612 of the landing gear strut 602 relative to the outer cylinder 610 of the landing gear strut 602. In some examples, the divided and/or simultaneous flow of pressurized hydraulic fluid into the first port 622 of the landing gear strut 602 and the first port 652 of the pressure-operated check valve 606 is continuously maintained once the shrinking of the landing gear strut 602 is complete and electrical power to the motor-operated valve 662 is removed.

In some examples (e.g., prior to and/or in connection with a landing procedure of an aircraft), the flow control member of the motor-operated valve 662 of FIGS. 6 and 7 may be actuated and/or moved from the open position to the closed position in response to an unshrink command received at the motor-operated valve 662. When the flow control member of the motor-operated valve 662 of FIGS. 6 and 7 is in the closed position, pressurized hydraulic fluid that may have previously been provided via the supply pressure source 658, through the check valve 660, and through the motor-operated valve 662 (e.g., when the motor-operated valve 662 is in the open position) may be freely returned through the motor-operated valve 662 (e.g., from port "S" to port "R" as shown in FIG. 6) to the return circuit 666 of the aircraft hydraulics 608 of FIGS. 6 and 7. When positioned in the closed position, the flow control member of the motor-operated valve 662 blocks and/or prevents the pressurized hydraulic fluid being delivered to the return circuit 666 from passing to the supply pressure source 658 of the aircraft hydraulic 608.

In some examples, the inner cylinder 612 of the landing gear strut 602 moves, slides, and/or is lowered relative to the outer cylinder 610 of the landing gear strut 602 to unshrink the landing gear strut 602 when the flow control member of the motor-operated valve 662 is in the closed position. In some examples, the landing gear strut 602 may unshrink based on the compressive forces of the combined vessel gas volume 644 and strut gas volume 620. In some examples, the landing gear strut 602 may unshrink based further on the weight of the inner cylinder 612 of the landing gear strut 602, which may include the weight of the wheels, tires, and other structures coupled to the inner cylinder 612 of the landing gear strut 602. As the inner cylinder 612 of the landing gear strut 602 moves, slides, and/or is lowered relative to the outer cylinder 610 of the landing gear strut 602 in connection with the unshrinking of the landing gear strut 602, the strut shrink piston 614 of FIGS. 6 and 7 decrease the volume of the strut shrink volume 616 of the landing gear strut 602, thereby resulting in pressurized hydraulic fluid being forced from the strut shrink volume 616 through the first port 622 of the landing gear strut 602 to the flow regulator 664, through the flow regulator 664 to the motor-operated valve 662, and through the motor-operated valve 662 to the return circuit 666 of the aircraft hydraulics 608 of FIGS. 6 and 7.

From the foregoing, it will be appreciated that the disclosed hydraulic shrink systems provide for shrinking and/or unshrinking of an aircraft landing gear strut independently from the kinematic motion associated with actuating the landing gear strut between a deployed position and a retracted position. Shrinking and/or unshrinking the landing gear strut independently from the kinematic motion of the landing gear strut advantageously allows for the shrinking and/or unshrinking processes of the landing gear strut to be performed independently relative to (e.g., in series, as opposed to in parallel with) the retraction and/or deployment process associated with the landing gear strut. It will further be appreciated that the disclosed hydraulic shrink systems include a gas volume that approximately doubles during the process of shrinking the landing gear strut. The doubling of the gas volume during the shrinking of the landing gear strut advantageously reduces the compressive force and/or actuation pressure required to complete the shrinking process.

In some examples, an apparatus is disclosed. In some disclosed examples, the apparatus comprises a landing gear strut, a transfer cylinder, aircraft hydraulics, a pressure vessel, and a pressure-operated check valve. In some disclosed examples, the landing gear strut has an outer cylinder and an inner cylinder. In some disclosed examples, the inner cylinder is movable relative to the outer cylinder between a first position and a second position. In some disclosed examples, the landing gear strut has a first length when the inner cylinder is in the first position and a second length less than the first length when the inner cylinder is in the second position. In some disclosed examples, the transfer cylinder is to exchange hydraulic fluid with the landing gear strut. In some disclosed examples, the aircraft hydraulics are to exchange hydraulic fluid with the transfer cylinder. In some disclosed examples, the pressure vessel is to exchange gas with the landing gear strut. In some disclosed examples, the pressure-operated check valve is operatively coupled to the aircraft hydraulics, the pressure vessel, and the landing gear strut. In some disclosed examples, the pressure-operated check valve is to control an exchange of gas between the pressure vessel and the landing gear strut based on hydraulic fluid received at the pressure-operated check valve from the aircraft hydraulics.

In some disclosed examples, the inner cylinder is to move between the first position and the second position independently from kinematic motion associated with moving the landing gear strut between a deployed position and a retracted position.

In some disclosed examples, the aircraft hydraulics are to simultaneously provide hydraulic fluid to the transfer cylinder and the pressure-operated check valve as the inner cylinder moves from the first position to the second position.

In some disclosed examples, pressurized gas from a strut gas volume of the landing gear strut passes through the pressure-operated check valve and into a vessel gas volume of the pressure vessel in response to the aircraft hydraulics providing hydraulic fluid to the pressure-operated check valve. In some disclosed examples, the vessel gas volume is to approximately double in response to the aircraft hydraulics providing hydraulic fluid to the pressure-operated check valve as the inner cylinder moves from the first position to the second position.

In some disclosed examples, the landing gear strut includes a strut shrink piston, a strut shrink volume, a strut liquid volume, a strut gas volume, a first port, and a second port. In some disclosed examples, the strut shrink volume is in fluid communication with the first port. In some disclosed examples, the strut shrink piston is located between the outer cylinder and the inner cylinder within the strut shrink volume. In some disclosed examples, the strut liquid volume is in fluid communication with the strut gas volume. In some disclosed examples, the strut gas volume is in fluid communication with the second port. In some disclosed examples, the first port is in fluid communication with the transfer cylinder. In some disclosed examples, the second port is in fluid communication with the pressure-operated check valve.

In some disclosed examples, the strut shrink volume includes first pressurized hydraulic fluid, the strut liquid volume includes second pressurized hydraulic fluid isolated from the first pressurized hydraulic fluid, and the strut gas volume includes pressurized gas.

In some disclosed examples, the strut shrink piston is to move the inner cylinder away from the first position and toward the second position in response to an increase in the strut shrink volume. In some disclosed examples, the strut gas volume is to decrease in response to the increase in the strut shrink volume.

In some disclosed examples, the transfer cylinder includes a cylinder shrink piston, a cylinder actuation volume, a cylinder shrink volume, a first port, and a second port. In some disclosed examples, the cylinder actuation volume is in fluid communication with the first port of the transfer cylinder. In some disclosed examples, the cylinder shrink piston is located between the cylinder actuation volume and the cylinder shrink volume. In some disclosed examples, the cylinder shrink volume is in fluid communication with the second port of the transfer cylinder. In some disclosed examples, the first port of the transfer cylinder is in fluid communication with the aircraft hydraulics. In some disclosed examples, the second port of the transfer cylinder is in fluid communication with the landing gear strut.

In some disclosed examples, the cylinder actuation volume includes first pressurized hydraulic fluid and the cylinder shrink volume includes second pressurized hydraulic fluid isolated from the first pressurized hydraulic fluid.

In some disclosed examples, the cylinder shrink piston is to move in response to an increase in the cylinder actuation volume. In some disclosed examples, the cylinder shrink volume is to decrease in response to the increase in the cylinder actuation volume. In some disclosed examples, the inner cylinder is to move away from the first position and toward the second position in response to the increase in the cylinder actuation volume.

In some disclosed examples, the transfer cylinder further includes a bulkhead, a compensator piston, a compensator spring, a cylinder compensator volume, a third port, and an opening. In some disclosed examples, the bulkhead is located between the cylinder shrink volume and the cylinder compensator volume. In some disclosed examples, the bulkhead includes a relief valve and a check valve to enable an exchange of pressurized hydraulic fluid between the cylinder shrink volume and the cylinder compensator volume. In some disclosed examples, the compensator piston is located between the cylinder compensator volume and the compensator spring. In some disclosed examples, the compensator spring is to bias the compensator piston away from the opening and toward the bulkhead. In some disclosed examples, the cylinder compensator volume is in fluid communication with the third port of the transfer cylinder. In some disclosed examples, the opening is to receive a first shaft of the cylinder shrink piston and a second shaft of the compensator piston. In some disclosed examples, the first shaft includes a drain path. In some disclosed examples, the second shaft circumscribes the first shaft.

In some examples, an apparatus is disclosed. In some disclosed examples, the apparatus comprises a landing gear strut, aircraft hydraulics, a pressure vessel, and a pressure-operated check valve. In some disclosed examples, the landing gear strut has an outer cylinder and an inner cylinder. In some disclosed examples, the inner cylinder is movable relative to the outer cylinder between a first position and a second position. In some disclosed examples, the landing gear strut has a first length when the inner cylinder is in the first position and a second length less than the first length when the inner cylinder is in the second position. In some disclosed examples, the aircraft hydraulics are to exchange hydraulic fluid with the landing gear strut. In some disclosed examples, the pressure vessel is to exchange gas with the landing gear strut. In some disclosed examples, the pressure-operated check valve is operatively coupled to the aircraft hydraulics, the pressure vessel, and the landing gear strut. In some disclosed examples, the pressure-operated check valve is to control an exchange of gas between the pressure vessel and the landing gear strut based on hydraulic fluid received at the pressure-operated check valve from the aircraft hydraulics.

In some disclosed examples, the inner cylinder is to move between the first position and the second position independently from kinematic motion associated with moving the landing gear strut between a deployed position and a retracted position.

In some disclosed examples, the aircraft hydraulics are to simultaneously provide hydraulic fluid to the landing gear strut and the pressure-operated check valve as the inner cylinder moves from the first position to the second position.

In some disclosed examples, pressurized gas from a strut gas volume of the landing gear strut passes through the pressure-operated check valve and into a vessel gas volume of the pressure vessel in response to the aircraft hydraulics providing hydraulic fluid to the pressure-operated check valve. In some disclosed examples, the vessel gas volume is to approximately double in response to the aircraft hydraulics providing hydraulic fluid to the pressure-operated check valve as the inner cylinder moves from the first position to the second position.

In some disclosed examples, the landing gear strut includes a strut shrink piston, a strut shrink volume, a strut liquid volume, a strut gas volume, a first port, and a second port. In some disclosed examples, the strut shrink volume is in fluid communication with the first port. In some disclosed examples, the strut shrink piston is located between the outer cylinder and the inner cylinder within the strut shrink volume. In some disclosed examples, the strut shrink piston has an associated travel limit. In some disclosed examples, the strut liquid volume is in fluid communication with the strut gas volume. In some disclosed examples, the strut gas volume is in fluid communication with the second port. In some disclosed examples, the first port is in fluid communication with the aircraft hydraulics. In some disclosed examples, the second port is in fluid communication with the pressure-operated check valve.

In some disclosed examples, the strut shrink volume includes first pressurized hydraulic fluid, the strut liquid volume includes second pressurized hydraulic fluid isolated from the first pressurized hydraulic fluid, and the strut gas volume includes pressurized gas.

In some disclosed examples, the strut shrink piston is to move the inner cylinder away from the first position and toward the second position in response to an increase in the strut shrink volume. In some disclosed examples, the strut gas volume is to decrease in response to the increase in the strut shrink volume.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a landing gear strut having an outer cylinder and an inner cylinder, the inner cylinder being movable relative to the outer cylinder between a first position and a second position, the landing gear strut having a first length when the inner cylinder is in the first position and a second length less than the first length when the inner cylinder is in the second position;
   a transfer cylinder operatively coupled to the landing gear strut and configured to exchange a first pressurized hydraulic fluid between a cylinder shrink volume of the transfer cylinder and a strut shrink volume of the landing gear strut;
   aircraft hydraulics operatively coupled to the transfer cylinder and configured to exchange a second pressurized hydraulic fluid between the aircraft hydraulics and a cylinder actuation volume of the transfer cylinder, the second pressurized hydraulic fluid being isolated from the first pressurized hydraulic fluid;
   a pressure vessel located externally relative to the landing gear strut and configured to exchange a pressurized gas between a vessel gas volume of the pressure vessel and a strut gas volume of the landing gear strut, the pressurized gas being isolated from both the first pressurized hydraulic fluid and the second pressurized hydraulic fluid; and
   a pressure-operated check valve operatively coupled to the aircraft hydraulics and operatively positioned between the vessel gas volume of the pressure vessel and the strut gas volume of the landing gear strut, the pressure-operated check valve being actuatable from a closed position to an open position in response to receiving a third pressurized hydraulic fluid from the aircraft hydraulics, the third pressurized hydraulic fluid being in fluid communication with the second pressurized hydraulic fluid.

2. The apparatus of claim 1, wherein the inner cylinder is configured to move between the first position and the second position independently from kinematic motion associated with moving the landing gear strut between a deployed position and a retracted position.

3. The apparatus of claim 1, wherein the aircraft hydraulics are configured to simultaneously provide the second pressurized hydraulic fluid to the cylinder actuation volume of the transfer cylinder and the third pressurized hydraulic fluid to the pressure-operated check valve as the inner cylinder moves from the first position to the second position.

4. The apparatus of claim 1, wherein a total gas volume of the pressurized gas contained within the pressure vessel is configured to at least double in response to the pressure-operated check valve receiving the third pressurized hydraulic fluid from the aircraft hydraulics as the inner cylinder moves from the first position to the second position.

5. The apparatus of claim 1, wherein the landing gear strut includes a strut shrink piston, a strut shrink volume, a first port, and a second port, the strut shrink volume being in fluid communication with the first port, the strut shrink piston being located between the outer cylinder and the inner cylinder within the strut shrink volume, the strut liquid volume being in fluid communication with the strut gas volume, the strut gas volume being in fluid communication with the second port, the first port being in fluid communication with the transfer cylinder, the second port being in fluid communication with the pressure-operated check valve.

6. The apparatus of claim 5, wherein the strut liquid volume includes a fourth pressurized hydraulic fluid isolated from the first pressurized hydraulic fluid, isolated from the second pressurized hydraulic fluid, and isolated from the third pressurized hydraulic fluid.

7. The apparatus of claim 5, wherein the strut shrink piston is configured to move the inner cylinder away from the first position and toward the second position in response to an increase in the strut shrink volume, the strut gas volume to decrease in response to the increase in the strut shrink volume.

8. The apparatus of claim 1, wherein the transfer cylinder includes a cylinder shrink piston, a first port, and a second port, the cylinder actuation volume being in fluid communication with the first port of the transfer cylinder, the cylinder shrink piston being located between the cylinder actuation volume and the cylinder shrink volume, the cylinder shrink volume being in fluid communication with the second port of the transfer cylinder, the first port of the transfer cylinder being in fluid communication with the aircraft hydraulics, the second port of the transfer cylinder being in fluid communication with the landing gear strut.

9. The apparatus of claim 8, wherein the cylinder shrink piston is configured to move in response to an increase in the cylinder actuation volume, the cylinder shrink volume to decrease in response to the increase in the cylinder actuation volume, the inner cylinder to move away from the first position and toward the second position in response to the increase in the cylinder actuation volume.

10. The apparatus of claim 8, wherein the transfer cylinder further includes a bulkhead, a compensator piston, a compensator spring, a cylinder compensator volume, a third port, and an opening, the bulkhead being located between the cylinder shrink volume and the cylinder compensator volume, the bulkhead including a relief valve and a check valve configured to enable an exchange of pressurized hydraulic fluid between the cylinder shrink volume and the cylinder compensator volume, the compensator piston being located between the cylinder compensator volume and the compensator spring, the compensator spring configured to bias the compensator piston away from the opening and toward the bulkhead, the cylinder compensator volume being in fluid communication with the third port of the transfer cylinder, the opening configured to receive a first shaft of the cylinder shrink piston and a second shaft of the compensator piston, the first shaft including a drain path, the second shaft circumscribing the first shaft.

11. The apparatus of claim 1, wherein the pressure-operated control valve is configured to:
enable the strut gas volume to pass from the landing gear strut, through the pressure-operated check valve, and into the vessel gas volume of the pressure vessel when the pressure-operated check valve is in the open position;
prevent the strut gas volume to pass from the landing gear strut, through the pressure-operated check valve, and into the vessel gas volume of the pressure vessel when the pressure-operated check valve is in the closed position; and
enable the vessel gas volume to pass from the pressure vessel, through the pressure-operated check valve, and into the strut gas volume of the landing gear strut when the pressure-operated check valve is in the closed position.

12. The apparatus of claim 1, wherein the pressure-operated control valve is mounted to the landing gear strut, the transfer cylinder is mounted to the landing gear strut, and the pressure vessel is mounted to an aircraft structure located within a landing gear well into which the landing gear strut is configured to retract.

13. An apparatus comprising:
a landing gear strut having an outer cylinder and an inner cylinder, the inner cylinder being movable relative to the outer cylinder between a first position and a second position, the landing gear strut having a first length when the inner cylinder is in the first position and a second length less than the first length when the inner cylinder is in the second position;
aircraft hydraulics operatively coupled to the landing gear strut and configured to exchange a first pressurized hydraulic fluid between the aircraft hydraulics and a strut shrink volume of the landing gear strut;
a pressure vessel located externally relative to the landing gear strut and configured to exchange a pressurized gas between a vessel gas volume of the pressure vessel and a strut gas volume of the landing gear strut, the pressurized gas being isolated from the first pressurized hydraulic fluid; and
a pressure-operated check valve operatively coupled to the aircraft hydraulics and operatively positioned between the vessel gas volume of the pressure vessel and the strut gas volume of the landing gear strut, the pressure-operated check valve being actuatable from a closed position to an open position in response to receiving a second hydraulic fluid from the aircraft hydraulics, the second pressurized hydraulic fluid being in fluid communication with the first pressurized hydraulic fluid.

14. The apparatus of claim 13, wherein the inner cylinder is configured to move between the first position and the second position independently from kinematic motion associated with moving the landing gear strut between a deployed position and a retracted position.

15. The apparatus of claim 13, wherein the aircraft hydraulics are configured to simultaneously provide the first pressurized hydraulic fluid to the strut shrink volume of the landing gear strut and the second pressurized hydraulic fluid to the pressure-operated check valve as the inner cylinder moves from the first position to the second position.

16. The apparatus of claim 13, wherein a total gas volume of the pressurized gas contained within the pressure vessel is configured to at least double in response to the pressure-operated check valve receiving the second pressurized hydraulic fluid from the aircraft hydraulics as the inner cylinder moves from the first position to the second position.

17. The apparatus of claim 13, wherein the landing gear strut includes a strut shrink piston, a strut liquid volume, a first port, and a second port, the strut shrink volume being in fluid communication with the first port, the strut shrink piston being located between the outer cylinder and the inner cylinder within the strut shrink volume, the strut shrink piston having an associated travel limit within the outer cylinder, the strut liquid volume being in fluid communication with the strut gas volume, the strut gas volume being in fluid communication with the second port, the first port being in fluid communication with the aircraft hydraulics, the second port being in fluid communication with the pressure-operated check valve.

18. The apparatus of claim 17, wherein the strut liquid volume includes a third pressurized hydraulic fluid isolated from the first pressurized hydraulic fluid and isolated from the second pressurized hydraulic fluid.

19. The apparatus of claim 17, wherein the strut shrink piston is configured to move the inner cylinder away from the first position and toward the second position in response to an increase in the strut shrink volume, the strut gas volume to decrease in response to the increase in the strut shrink volume.

20. The apparatus of claim 13, wherein the pressure-operated control valve is configured to:
enable the strut gas volume to pass from the landing gear strut, through the pressure-operated check valve, and into the vessel gas volume of the pressure vessel when the pressure-operated check valve is in the open position;
prevent the strut gas volume to pass from the landing gear strut, through the pressure-operated check valve, and into the vessel gas volume of the pressure vessel when the pressure-operated check valve is in the closed position; and
enable the vessel gas volume to pass from the pressure vessel, through the pressure-operated check valve, and into the strut gas volume of the landing gear strut when the pressure-operated check valve is in the closed position.

21. The apparatus of claim 13, wherein the pressure-operated control valve is mounted to the landing gear strut, and the pressure vessel is mounted to an aircraft structure located within a landing gear well into which the landing gear strut is configured to retract.

\* \* \* \* \*

UNITED STATES PATENT AND TRADEMARK OFFICE
CERTIFICATE OF CORRECTION

PATENT NO. : 10,661,889 B2  
APPLICATION NO. : 15/866135  
DATED : May 26, 2020  
INVENTOR(S) : Leo W. Plude et al.

Page 1 of 1

It is certified that error appears in the above-identified patent and that said Letters Patent is hereby corrected as shown below:

In the Claims

Column 26, Claim 5, Line 32, replace "a strut shrink volume" with --a strut liquid volume--

Column 27, Claim 11, Lines 23-24, replace "the pressure-operated control valve" with --the pressure-operated check valve--

Column 27, Claim 12, Lines 40-41, replace "the pressure-operated control valve" with --the pressure-operated check valve--

Column 28, Claim 13, Line 3, replace "a second hydraulic fluid" with --a second pressurized hydraulic fluid--

Column 28, Claim 20, Lines 48-49, replace "the pressure-operated control valve" with --the pressure-operated check valve--

Column 28, Claim 21, Lines 65-66, replace "the pressure-operated control valve" with --the pressure-operated check valve--

Signed and Sealed this  
Twentieth Day of October, 2020

Andrei Iancu  
*Director of the United States Patent and Trademark Office*